United States Patent
Borchardt

(10) Patent No.: US 10,196,177 B2
(45) Date of Patent: Feb. 5, 2019

(54) MULTI-LAYERED THERMOPLASTIC FILMS AND BAGS WITH ENHANCED LIGHT TRANSMITTANCE AND METHODS FOR MAKING THE SAME

(71) Applicant: The Glad Products Company, Oakland, CA (US)

(72) Inventor: Michael G. Borchardt, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 155 days.

(21) Appl. No.: 14/508,850

(22) Filed: Oct. 7, 2014

(65) Prior Publication Data

US 2015/0030266 A1 Jan. 29, 2015

Related U.S. Application Data

(63) Continuation-in-part of application No. 13/299,177, filed on Nov. 17, 2011, now Pat. No. 9,186,862,
(Continued)

(51) Int. Cl.
  *B32B 3/30* (2006.01)
  *B65D 33/00* (2006.01)
(Continued)

(52) U.S. Cl.
  CPC ............ *B65D 33/00* (2013.01); *B30B 11/18* (2013.01); *B31B 50/64* (2017.08); *B31B 50/74* (2017.08);
(Continued)

(58) Field of Classification Search
  CPC .......... B65D 33/00; B30B 3/04; B30B 11/16; B30B 11/18; B32B 1/02; B32B 3/26; B32B 3/263; B32B 3/28; B32B 3/30; B32B 7/02; B32B 7/045; B32B 27/06; B32B 27/08; B32B 37/0076; B32B 37/0084; B32B 37/10; B32B 37/1045; Y10T 428/24132; Y10T 428/24479; Y10T 428/24521;
(Continued)

(56) References Cited

U.S. PATENT DOCUMENTS 3,973,063 A * 8/1976 Clayton .................... B32B 7/04
156/209
5,153,382 A * 10/1992 Gross ........................ C08F 8/00
174/110 PM
(Continued)

FOREIGN PATENT DOCUMENTS

WO WO 2009090208 A1 * 7/2009 ............. B29C 55/18

*Primary Examiner* — Megha M Gaitonde
(74) *Attorney, Agent, or Firm* — Thomas C. Feix

(57) ABSTRACT

Implementations described herein include films with maintained or decreased light transmittance despite a reduction in gauge. In particular, one or more implementations include a multi-layer film with each layer having differing opacity agents. The combination of the two different opacity agents in two different layers can have a synergistic effect that provide decreased light transmittance. Indeed, in one or more embodiments a multi-layer film with differing opacity agents in each layer has a decreased light transmittance despite a reduction in gauge and opacity agents.

20 Claims, 22 Drawing Sheets

Related U.S. Application Data which is a continuation-in-part of application No. 12/947,025, filed on Nov. 16, 2010, now Pat. No. 8,603,609, application No. 14/508,850, filed on Oct. 7, 2014, which is a continuation-in-part of application No. 13/289,829, filed on Nov. 4, 2011, now Pat. No. 9,108,390.

(60) Provisional application No. 61/261,673, filed on Nov. 16, 2009.

(51) Int. Cl.

| | | |
|---|---|---|
| *B32B 3/28* | (2006.01) | |
| *B32B 27/08* | (2006.01) | |
| *B32B 37/10* | (2006.01) | |
| *B32B 38/00* | (2006.01) | |
| *B32B 1/02* | (2006.01) | |
| *B32B 7/04* | (2006.01) | |
| *B32B 3/10* | (2006.01) | |
| *B30B 11/18* | (2006.01) | |
| *B32B 7/02* | (2006.01) | |
| *B32B 27/18* | (2006.01) | |
| *B31B 50/64* | (2017.01) | |
| *B31B 50/74* | (2017.01) | |

(52) U.S. Cl.
CPC ............... *B32B 1/02* (2013.01); *B32B 3/10* (2013.01); *B32B 3/28* (2013.01); *B32B 3/30* (2013.01); *B32B 7/02* (2013.01); *B32B 7/045* (2013.01); *B32B 27/08* (2013.01); *B32B 27/18* (2013.01); *B32B 37/10* (2013.01); *B32B 38/0012* (2013.01); *B32B 2038/0028* (2013.01); *B32B 2250/24* (2013.01); *B32B 2264/102* (2013.01); *B32B 2305/02* (2013.01); *B32B 2307/41* (2013.01); *B32B 2307/412* (2013.01); *B32B 2307/414* (2013.01); *B32B 2307/7163* (2013.01); *B32B 2307/746* (2013.01); *B32B 2439/00* (2013.01); *B32B 2439/46* (2013.01); *Y10T 156/1038* (2015.01); *Y10T 156/1039* (2015.01); *Y10T 428/1352* (2015.01); *Y10T 428/24562* (2015.01); *Y10T 428/24612* (2015.01)

(58) Field of Classification Search
CPC ....... Y10T 428/24537; Y10T 428/2457; Y10T 428/24612; Y10T 428/24802; Y10T 428/24826; Y10T 428/24942; Y10T 428/2495
USPC ....... 428/114, 141, 156, 161, 163, 159, 167, 428/169, 172, 188, 195.1, 198, 212, 213
See application file for complete search history.

(56) References Cited

U.S. PATENT DOCUMENTS

| | | | |
|---|---|---|---|
| 6,312,742 B1* | 11/2001 | Wood | B65B 7/06 383/111 |
| 7,132,151 B2* | 11/2006 | Rasmussen | B32B 3/28 156/205 |
| 2012/0033900 A1* | 2/2012 | Fraser | B32B 7/02 383/105 |
| 2012/0269466 A1* | 10/2012 | Dorsey | B65D 31/02 383/109 |

* cited by examiner

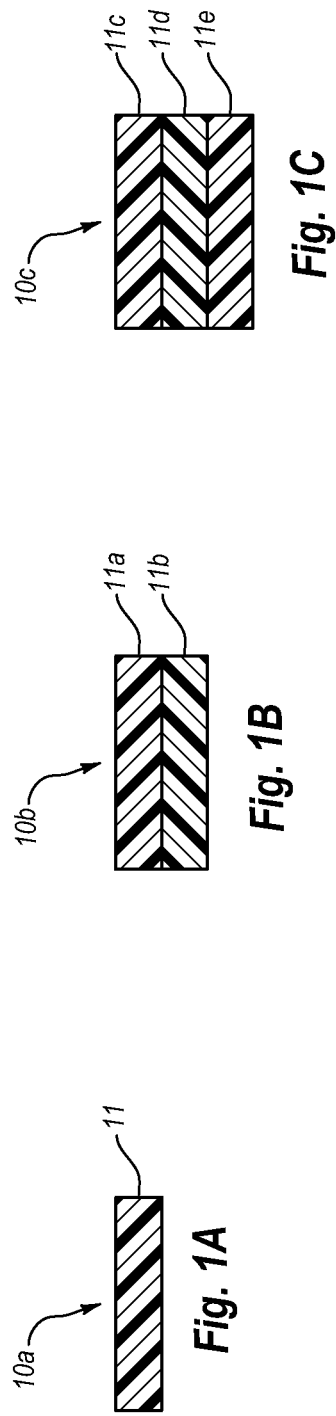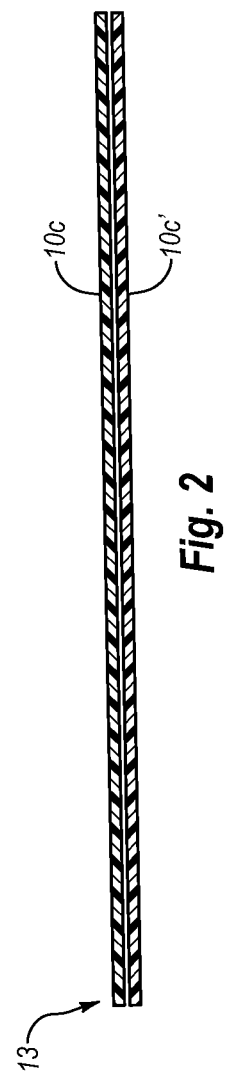

MULTI-LAYERED THERMOPLASTIC FILMS AND BAGS WITH ENHANCED LIGHT TRANSMITTANCE AND METHODS FOR MAKING THE SAME

CROSS-REFERENCE TO RELATED APPLICATIONS

The present application is a continuation-in-part of U.S. patent application Ser. No. 13/299,177 filed Nov. 17, 2011 and entitled MULTI-LAYERED LIGHTLY-LAMINATED FILMS AND METHODS OF MAKING THE SAME, which is a continuation-in-part of U.S. patent application Ser. No. 12/947,025 filed Nov. 16, 2010 and entitled DISCONTINUOUSLY LAMINATED FILM and issued on Dec. 10, 2013 as U.S. Pat. No. 8,603,609, which claims the benefit of and priority to U.S. Provisional Application No. 61/261,673, filed Nov. 16, 2009. The present application is also a continuation-in-part of U.S. patent application Ser. No. 13/289,829 filed Nov. 4, 2011 and entitled INCREMENTALLY-STRETCHED THERMOPLASTIC FILMS AND BAGS WITH INCREASED HAZE. Each of the above-referenced patent and applications is hereby incorporated by reference in its entirety.

BACKGROUND OF THE INVENTION

1. The Field of the Invention

The present invention relates generally to thermoplastic films. Specifically, the invention relates multi-layer thermoplastic films with maintained or decreased light transmittance despite a reduction in gauge and/or opacity agents.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many attempt to control manufacturing costs by decreasing the amount of thermoplastic material in a given product.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

To MDO a film, manufacturers commonly heat the film to an elevated temperature and stretch the film in the machine direction. Commonly, manufacturers will stretch the thermoplastic film between approximately 300 to 500 percent of the film's original length or more.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

Stretched films of reduced thickness can allow manufacturers to use less thermoplastic material to form a product of a given surface area or size. Reducing the gauge (i.e., thickness) of a film; however, can make the film more transparent or translucent. Consumers commonly associate thinner films and/or transparent films with weakness; and thus, may be dissuaded to purchase stretched films. Manufacturers may add pigments and/or additives, such as Ti02 or voiding agents, to add either color and/or opacity to thinner films. Unfortunately, additives, such as Ti02 and voiding agents can be expensive and/or often negatively impact the film strength properties, especially as the additive concentration is increased. Furthermore, even pigmented films commonly become less opaque upon stretching.

Optical measurements affecting opacity include light transmission, haze, and clarity. Light transmission is a measure of how much light is absorbed when passing through a film. Haze measures wide angle light scattering, and is a way of quantifying how well one can see contrast through films. Clarity measures narrow angle light scattering, and is a way of quantifying the ability to resolve detail through a film. ASTM D1003-11 or the Standard Test Method for Haze and Luminous Transmittance of Transparent Plastics describes how haze and other optical properties of films can be measured. ASTM D1003-11 is hereby incorporated by reference in its entirety.

The increasing transparency or decreasing the opacity of a film upon stretching may dissuade manufacturers to stretch a film or use thinner films despite the potential material savings. For example, one common use of thermoplastic films is bags for liners in trash or refuse receptacles. Many consumers may prefer opaque and non-transparent trash bags that prevent others (i.e., neighbors) from viewing the contents in the trash bag.

Accordingly, there are a number of considerations to be made in thermoplastic films and manufacturing methods.

BRIEF SUMMARY

One or more implementations of the present invention solve one or more of the foregoing or other problems in the art with apparatus and methods for decreasing the light transmission of films. In particular, one or more implementations of the present invention include multi-layer films that have less light transmittance. Additionally, one or more implementations of the present invention include methods of incrementally stretching multi-layer films to reduce their gauge by weight, while simultaneously decreasing the films' light transmittance.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 1A-1C illustrate views of various films structures in accordance with one or more implementations of the present invention;

FIG. 2 illustrates a multi-layer thermoplastic film with decreased light transmittance in accordance with one or more implementations of the present invention;

DETAILED DESCRIPTION

Figure 3A:
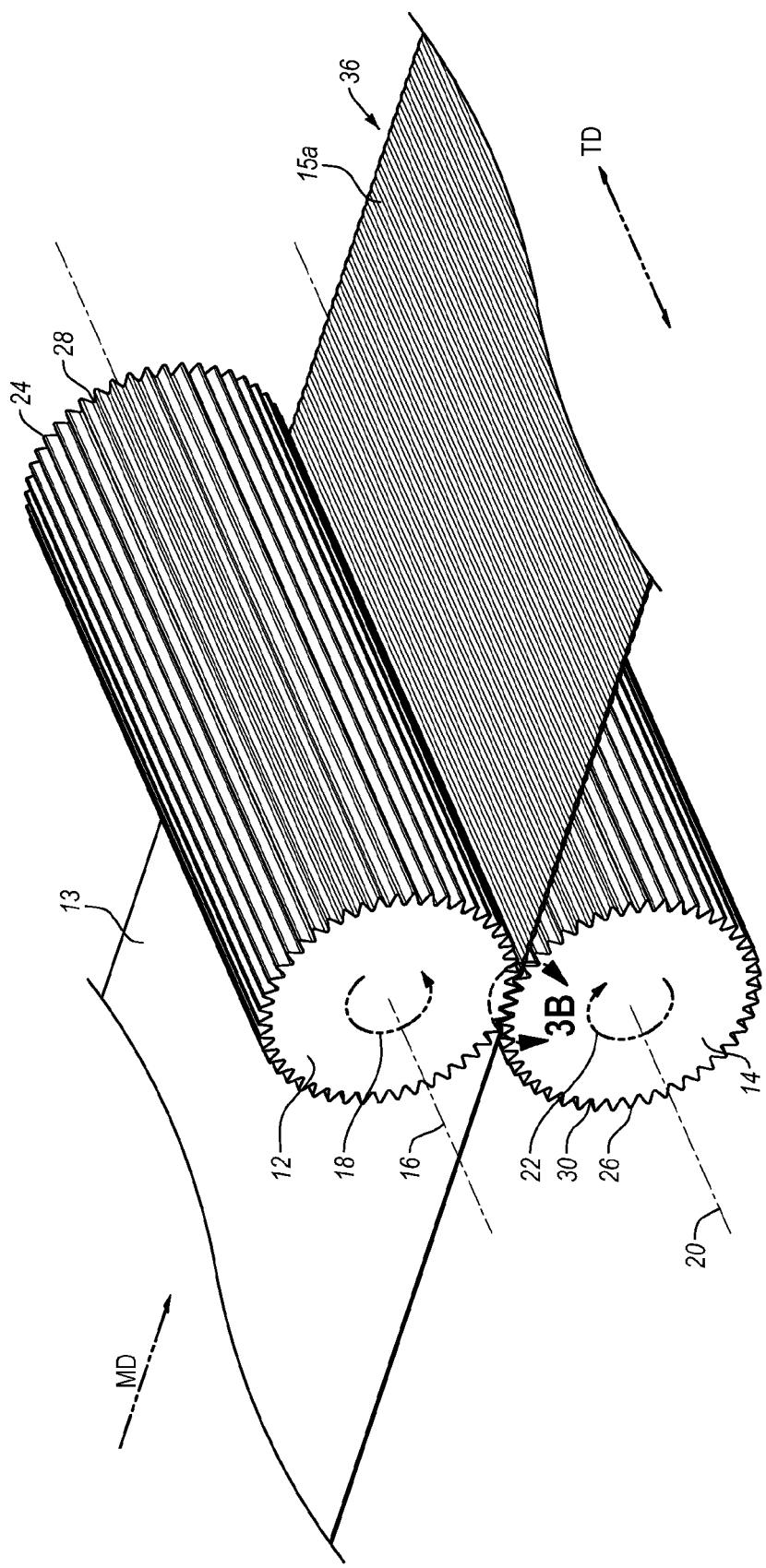
FIG. 3A illustrates a schematic diagram of two thermoplastic films being lightly laminated by MD intermeshing rollers in accordance with one or more implementations of the present invention.

One or more implementations of the present invention include apparatus and methods for decreasing the light transmission of films. In particular, one or more implementations of the present invention include multi-layer films that have less light transmittance. Additionally, one or more implementations of the present invention include methods of incrementally stretching multi-layer films to reduce their gauge by weight, while simultaneously maintaining or decreasing the films' light transmittance.

In particular, one or more implementations include a multi-layer film with each layer having differing opacity agents. The combination of the two different opacity agents in two different layers can have a synergistic effect that provides for decreased light transmittance. Indeed, in one or more embodiments a multi-layer film with differing opacity agents in each layer has a decreased light transmittance despite a reduction in gauge.

For example, one or more implementations include a multi-layer thermoplastic film with one layer of the multi-layer film having a light reflecting opacity agent and another layer having a light absorption opacity agent. The combination of the two different opacity agents in the two different layers of the multi-layer film can decrease light transmittance despite a reduction in a total amount of opacity agents used in the film. Thus, one or more embodiments can appear to be more opaque despite using less opacity agents, such as pigments, thereby resulting in significant cost savings.

As mentioned, one or more implementations of the present invention can provide thermoplastic films, and products made there from, with reduced gauge yet decreased light transmittance. In other words, one or more implementations can provide thinner films without making the film more transparent or translucent. Thus, one or more implementations can reduce the material needed to produce a product without compromising important material properties, such as opacity. One will appreciate in view of the disclosure herein that such material reductions can provide significant cost savings by reducing an amount of raw material in a given product.

Additionally, consumers may associate thinner films with decreased strength. Indeed, such consumers may feel that they are receiving less value for their money when purchasing thermoplastic film products with thinner gauges. One will appreciate in view of the disclosure herein that a consumer may not readily detect that one or more multi-layer films of the present invention has a reduced gauge. In particular, by decreasing the light transmittance and stretching, the consumer may perceive the film as being thicker and/or having increased strength.

As explained in greater detail below, one or more implementations of the present invention allow for decreased light transmittance, with less use of additives, such as pigments or voiding agents, to color or add opacity to a film. The reduction in additives can lead to significant cost savings. Additionally, the use of no, or less, additives such as voiding agents can reduce or eliminate strength degradation associated with many additives.

In particular, one or more embodiments include films that are thinner, include less opacity agents, and have lower light transmissions than standard films. For example, one or more implementations include films that are 20% thinner, include between 40 percent and 60 percent less opacity agents, and have maintained or lower light transmission when compared to standard quality while films used in the trash bag industry.

In addition to the foregoing, one or more implementations of the present invention include multi-layer films that are discontinuously bonded together. In other words, in one or more implementations the adjacent layers of the multi-layer film can be incrementally separated. The separation between the layers can help diffuse light travelling through the multi-layer film.

In addition to helping to decrease light transmittance, the discontinuous bonding can also enhance the strength and other properties of the film. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

In particular, the weak bonds or bond regions of adjacent layers of multi-layer films in accordance with one or more implementations can act to first absorb forces via breaking of the bonds prior to allowing that same force to cause failure of the individual layers of the multi-layer film. Such action can provide increased strength to the multi-layer film. In one or more implementations, the weak bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the multi-layer film.

Thus, in one or more implementations, the weak bonds or bond regions of a multi-layer film can fail before either of the individual layers undergoes molecular-level deformation. For example, an applied strain can pull the weak bonds or bond regions apart prior to any molecular-level deformation (stretching, tearing, puncturing, etc.) of the individual film layers. In other words, the weak bonds or bond regions can provide less resistive force to an applied strain than molecular-level deformation of any of the layers of the multi-layer film. The inventors have surprisingly found that such a configuration of weak bonding can provide increased strength properties to the multi-layer film as compared to a monolayer film of equal thickness or a multi-layer film in which the plurality of layers are tightly bonded together (e.g., coextruded).

One or more implementations of the present invention provide for tailoring the bonds or bond regions between layers of a multi-layer film to ensure weak bonding and associated increased strength. For example, one or more implementations include modifying or tailoring one or more of a bond strength, bond density, bond pattern, or bond size between adjacent layers of a multi-layer film to deliver a film with strength characteristics better than or equal to the sum of the strength characteristics of the individual layers. Such bond tailoring can allow for multi-layer films at a lower basis weight (amount of raw material) to perform the same as or better than higher basis weight monolayer or coextruded films.

Relatively weak bonding and stretching of the two or more layers of the multi-layer film can be accomplished simultaneously through one or more suitable techniques. For example, bonding and stretching may be achieved by pressure (for example MD ring rolling, TD ring rolling, DD ring rolling, stainable network lamination, or embossing), or with a combination of heat and pressure. Alternately, a manufacturer can first stretch the films and then bond the films using one or more bonding techniques. For example, one or more implementations can include ultrasonic bonding to lightly laminate the film layers. Alternately or additionally, adhesives can laminate the films. Treatment with a Corona discharge can enhance any of the above methods. Prior to lamination, the separate layers can be flat film or can be subject to separate processes, such as stretching, slitting, coating and printing, and corona treatment.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present invention, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the film, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

In one or more implementations, the light lamination or bonding between layers of a multi-layer film may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

Film Materials

As an initial matter, the thermoplastic material of the films of one or more implementations can include, but are not limited to, thermoplastic polyolefins, including polyethylene and copolymers thereof and polypropylene and copolymers thereof. The olefin-based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, one or more implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. In particular, one or more embodiments include opacity agents. As used herein the term "opacity agent" refers to an agent that when added to a thermoplastic film increases the opacity of the film (i.e., decreases the transparency or light transmittance through the film). One example of an opacity agent is pigments. Pigments can be light reflecting (e.g., white pigments) or light absorbing (e.g., black pigments). Examples of pigments suitable for one or more implementations include titanium dioxide, Antimony Oxide, Zinc Oxide, metal carbonates, White Lead, Lithopone, Clay, Magnesium Silicate, Barytes (BaSO4), and Calcium Carbonate (CaCO3).

Additional additives that may be included in one or more embodiments include slip agents, anti-block agents, voiding agents, or tackifiers. Additionally, one or more implementations of the present invention include films that are devoid of voiding agents. Some examples of inorganic voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. Organic voiding agents, polymers that are immiscible in the major polymer matrix, can also be used. For instance, polystyrene is a can be used as a voiding agent in polyethylene and polypropylene films.

One will appreciate in view of the disclosure herein that manufacturers may form the films or webs to be used with the present invention using a wide variety of techniques. For example, a manufacturer can form precursor mix of the thermoplastic material and one or more additives. The manufacturer can then form the film(s) from the precursor mix using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

As an initial matter, one or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

FIG. 1A illustrates a film ply 10a of a single layer 11. In another implementation, as illustrated by FIG. 1B, a film ply 10b can have two layers (i.e., a bi-layered film). In particular, the film ply 10b can include a first layer 11a and a second layer 11b. The first and second layers 11a, 11b can optionally include different grades of thermoplastic material or include different additives, including polymer additives. In still another implementation, shown in FIG. 1C, a film ply 10c can include three layers (i.e., a tri-layered film). For example, FIG. 1C illustrates that the film 10c can include a first layer 11c, a second layer 11d, and a third layer 11e.

In at least one implementation, such as shown in FIG. 1C, a multilayered film 10c can include co-extruded layers. For example, the film 10c can include a three-layer B:A:B structure, where the ratio of layers can be 20:60:20. The exterior B layers (i.e., 11c, 11e) can comprise a mixture of hexene LLDPE of density 0.918, and metallocene LLDPE of density 0.918. The interior A core layer (11d) can comprise a mixture of hexene LLDPE of density 0.918, butene LLDPE of density 0.918, reclaimed resin from trash bags. Additionally, the A core layer 11d can include an opacity agent. For example, the A core layer 11d can include a colorant containing carbon black in an amount between about 0.1 percent and about 6%. More particularly, the A core layer 11d can include a colorant containing carbon black in an amount between about 0.25 percent and about 0.75% resulting a translucent film that appears like a gray or clouded clear film.

In another implementation, the film 10c is a coextruded three-layer B:A:B structure, where the ratio of layers is 20:60:20. The exterior B layers (11c, 11e) can comprise hexene LLDPE of density 0.918, and metallocene LLDPE of density 0.918. The interior A core layer (11d) can comprise hexene LLDPE of density 0.918, metallocene LLDPE of density 0.918, butene LLDPE of density 0.918, reclaimed resin from trash bags. The A core layer 11d can also include a processing aide, colorant containing carbon black, and colorant containing white TiO2, resulting in a grey colored film. In some implementations, the carbon black or reclaimed resin can be omitted, resulting in a white colored film. In such embodiments, the A core layer 11d can a white colorant in an amount between about 0.1 percent and about 8%. More particularly, the A core layer 11d can include a white colorant in an amount between about 3 percent and about 7% or about 4% and about 6% resulting a white film.

In another example, the film 10c is a coextruded three-layer B:A:B structure where the ratio of layers is 15:70:15. In one or more implementations, the LLDPE can comprise greater than 50% of the overall thermoplastic material in the film 10c.

In another example, the film 10c is a coextruded three-layer C:A:B structure where the ratio of layers is 20:60:20. The C layer 11c can comprise a LLDPE material with a first colorant (e.g., black). The B layer 11e can also comprise a LLDPE material with a second colorant (e.g., white). The LLDPE material can have a MI of 1.0 and density of 0.920 g/cm3. The A core layer 11d can comprise similar materials to any of the core layer describe above. The A core layer 11d can comprise a white colorant or can be clear.

FIG. 2 illustrates a view of a multi-layer film 13 in accordance with one or more embodiments of the present invention. As shown, the multi-layer film 13 can include a first film layer 10c and a second film layer 10c'. The first film layer 10c and the second film layer 10c' can include a configuration to provide the multi-layer film 13 with maintained or decreased light transmittance despite a reduced gauge when compared to standard films.

As shown by FIG. 2 each layer of the multi-layer film 13 can include a film layer 10c, 10c' that is a tri-layer co-extruded film as described above in relation to FIG. 1C. In alternative embodiments the layers of the multi-layer film 13 can be mono-layer, bi-layered, or include more than three layers. In any event, the multi-layer film 13 can have one layer 10c with a light reflecting opacity agent and a second layer 10c' with a light absorbing opacity agent. Furthermore, when formed in a bag, the layer 10c with the light reflecting opacity agent can be positioned on the outside of the bag. Positioning the layer 10c with the light reflecting opacity agent on the outside, can decrease the light transmittance compared to the same multi-layer film 13 in which the layer 10c with the light reflecting opacity agent is on the inside.

Additionally or alternatively, the multi-layer film 13 can have one layer 10c with a first concentration of an opacity agent and a second layer 10c' with a second concentration of an opacity agent that is less that the first concentration. Furthermore, when formed in a bag, the layer 10c with the greater concentration of the opacity agent can be positioned on the outside of the bag. Positioning the layer 10c with the greater concentration of the opacity agent on the outside, can decrease the light transmittance compared to the same multi-layer film 13 in which the layer with the greater concentration of the opacity agent is on the inside.

FIG. 2 also illustrates that the layers 10c, 10c' of the multi-layer film 13 can be at least partially separated. In other words, the layers 10c, 10c' of the multi-layer film 13 are separate and distinct layer that are not co-extruded together even though each layer can include sub layers that are co-extruded. Specifically, FIG. 2 illustrates that the layers 10c, 10c' of the multi-layer film 13 are un-bonded. In alternative embodiments, the layers 10c, 10c' of the multi-layer film 13 can be incrementally stretched and bonded as described below.

Figure 3B:
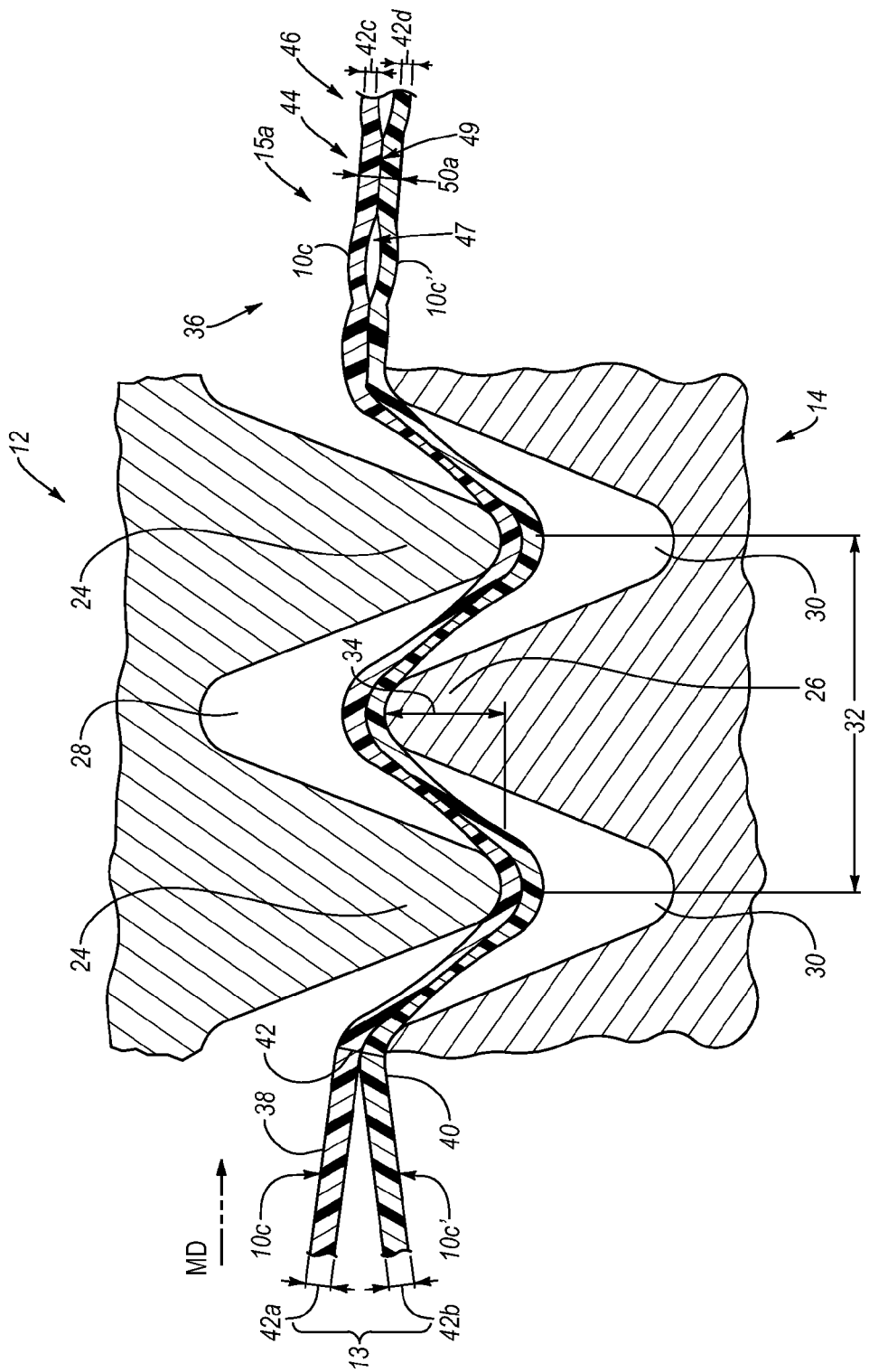
FIG. 3B illustrates an enlarged view of the two thermoplastic films passing together through the intermeshing rollers of FIG. 3A taken along the circle 3B of FIG. 3A to form a multi-layered lightly-laminated thermoplastic film in accordance with one or more implementations of the present invention.

As previously mentioned, according to one implementation of the invention, the separate layers of the multi-layer film are non-continuously, lightly bonded to one another. FIGS. 3A-3B illustrate exemplary processes of partially discontinuously bonding adjacent layers of a multi-layer thermoplastic film in accordance with an implementation of the present invention to create an intermittingly bonded and stretched multi-layer film with maintained or decreased light transmittance. In particular, FIGS. 3A-3B illustrate an MD ring rolling process that partially discontinuously laminates the individual adjacent layers of thermoplastic multi-layered film 13 by passing the multi-layered film 13 through a pair of MD intermeshing rollers 12, 14. As a result of MD ring rolling, the multi-layered film 13 is also intermittently stretched in the machine direction MD.

As shown by the FIGS. 3A-3B, the first roller 12 and the second roller 14 can each have a generally cylindrical shape. The MD intermeshing rollers 12, 14 may be made of cast and/or machined metal, such as, steel, aluminum, or any other suitable material. The MD intermeshing rollers 12, 14 can rotate in opposite directions about parallel axes of rotation. For example, FIG. 3A illustrates that the first roller 12 can rotate about a first axis 16 of rotation in a counter-clockwise direction 18. FIG. 3A also illustrates that the second roller 14 can rotate about a second axis 20 of rotation in a clockwise direction 22. The axes of rotation 16, 20 can be parallel to the transverse direction TD and perpendicular to the machine direction MD.

The intermeshing rollers 12, 14 can closely resemble fine pitch spur gears. In particular, the MD intermeshing rollers 12, 14 can include a plurality of protruding ridges 24, 26. The ridges 24, 26 can extend along the MD intermeshing rollers 12, 14 in a direction generally parallel to axes of rotation 16, 20 and perpendicular to the machine direction of the film 13 passing through the MD intermeshing rollers 12, 14. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 3B. In alternative implementations, the tips of the ridges 24, 26 can have sharp angled corners. FIGS. 3A-3B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the MD intermeshing rollers 12, 14 intermesh. Similarly, the grooves 30 of the second roller 14 can receive the ridges 24 of the first roller 12.

One will appreciate in view of the disclosure herein that the configuration of the ridges 24, 26 and grooves 28, 30 can prevent contact between ridges 24, 26 during intermeshing so that no rotational torque is transmitted during operation. Additionally, the configuration of the ridges 24, 26 and grooves 28, 30 can affect the amount of stretching and the bond strength resulting from partially discontinuous lamination as the film passes through MD intermeshing rollers 12, 14.

Referring specifically to FIG. 3B, various features of the ridges 24, 26 and grooves 28, 30 are shown in greater detail. The pitch and depth of engagement of the ridges 24, 26 can determine, at least in part, the amount of incremental stretching and partially discontinuous lamination caused by the MD intermeshing rollers 12, 14. As shown by FIG. 3B, the pitch 32 is the distance between the tips of two adjacent ridges on the same roller. The "depth of engagement" ("DOE") 34 is the amount of overlap between ridges 24, 26 of the different MD intermeshing rollers 12, 14 during intermeshing.

The ratio of DOE 34 to pitch 32 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 3A, the direction of travel of the multi-layered film 13 through the MD intermeshing rollers 12, 14 is parallel to the machine direction and perpendicular to the transverse direction. As the thermoplastic multi-layered film 13 passes between the MD intermeshing rollers 12, 14, the ridges 24, 26 can incrementally stretch the multi-layered film 13 in the machine direction. In one or more implementations, stretching the multi-layered film 13 in the machine direction can reduce the gauge of the film and increase the length of the multi-layered film 13. In other implementations, the multi-layered film 13 may rebound after stretching such that the gauge of the multi-layered film 13 is not decreased. Furthermore, in one or more implementations, stretching the film 13 in the machine direction can reduce the width of the multi-layered film 13. For example, as the multi-layered film 13 is lengthened in the machine direction, the film's length can be reduced in the transverse direction.

In particular, as the multi-layered film 13 proceeds between the MD intermeshing rollers 12, 14, the ridges 24 of the first roller 12 can push the multi-layered film 13 into the grooves 30 of the second roller 14 and vice versa. The pulling of the multi-layered film 13 by the ridges 24, 26 can stretch the multi-layered film 13. The MD intermeshing rollers 12, 14 may not stretch the multi-layered film 13 evenly along its length. Specifically, the MD intermeshing rollers 12, 14 can stretch the portions of the film 13 between the ridges 24, 26 more than the portions of the multi-layered film 13 that contact the ridges 24, 26. Thus, the MD intermeshing rollers 12, 14 can impart or form a generally striped pattern 36 into the multi-layered film 13. As used herein, the terms "impart" and "form" refer to the creation of a desired structure or geometry in a film upon stretching the film that will at least partially retain the desired structure or geometry when the film is no longer subject to any strains or externally applied forces.

FIGS. 3A-3B illustrate that the starting or initial film 13 (i.e., the film that is yet to pass through the MD intermeshing rollers 12, 14) can have a substantially flat top surface 38 and substantially flat bottom surface 40. As seen in FIG. 3B, the multi-layer film 13 may comprise two layers 10c and 10c' that are initially separate from one another. The film 13 can have an initial thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual layers 10c and 10c' can be substantially uniform along the length of the multi-layer film 13. Because the inner surfaces of each layer 10c and 10c' are somewhat tacky, the layers become lightly bonded together as they are pulled through and stretched by MD intermeshing rollers 12, 14. Those areas that are un-stretched or stretched less become lightly bonded together.

In one or more implementations, the initial film 13 need not have an entirely flat top surface 38, but may be rough or uneven. Similarly, bottom surface 40 or the inner oriented surfaces of layers 10c and 10c' of the film 13 can also be rough or uneven. Further, the starting gauge 42, 42a, and 42b need not be consistent or uniform throughout the entirety of pre-stretched film 13. Thus, the starting gauge 42, 42a, and 42b can vary due to product design, manufacturing defects, tolerances, or other processing issues. According to one embodiment, the individual layers 10c and 10c' may be pre-stretched (e.g., through MD ring rolling, TD ring rolling, etc.) before being positioned adjacent to the other layer (10c' or 10c, respectively). Such pre-stretching of individual layers can result in a striped surface exhibiting an uneven top and bottom surface similar to that seen in FIG. 3A.

FIG. 3B illustrates that films 13, can include two initially separate film layers 10c-10c'. In an alternative implementation, the film 13 (and thus the resultant incrementally stretched film 10) can include three initially separate film layers: a middle film layer and two outer film layers. In other embodiments, more than 3 layers may be provided (four, five, six, or more partially discontinuously or discontinuously laminated layers).

As seen in FIG. 3A, upon stretching and partially discontinuously laminating the adjacent layers, the intermittingly bonded and stretched multi-layer film with maintained or decreased light transmittance 15a can include a striped pattern 36. The striped pattern 36 can include alternating series of stretched (or more stretched) regions or thinner webs 46 adjacent to un-stretched regions (or less stretched) or thinner ribs 44. FIG. 3B illustrates that the MD intermeshing rollers 12, 14 can incrementally stretch and partially discontinuously bond films 10c, 10c' to create multi-layered lightly-laminated multi-layer films 15a including bonded regions or bonds 49 and un-bonded regions 47. For example, FIG. 3B illustrates that the film layers 10c, 10c' of the multi-layered lightly-laminated film 15a can be laminated together at the thicker ribs 44 while the stretched (i.e., thinner) regions 46 may not be laminated together.

In addition to any compositional differences between layers 10c, 10c' of a given multi-layer film, the different film layers can have differing gauges or thicknesses. In one or more implementations, the film layers may be substantially equal to one another in thickness. For example, the inventors have found that the MD or TD tear resistance of the composite, multi-layer film is typically approximately equal to the lowest MD or TD tear value of the individual layers, absent any increase in tear resistance provided by weak bonding. In other words, the weakest layer often determines the strength of the multi-layer film structure.

As shown by FIG. 3B the bonded regions 49 of the multi-layered lightly-laminated films 15a can have an average thickness or gauge 50a. The average gauge 50a can be approximately equal to the combined starting gauges 42a, 42b of the starting films. In the Figures, separation between the unbonded layers at unbonded regions 47 is exaggerated for purposes of clarity. In one or more implementations, the average gauge 50a can be less than the combined starting gauges 42a-42b. The films 10c, 10c' of the un-bonded regions 47 can each have an average thickness or gauge 42c, 42d. In one or more implementations, the average gauges 42c, 42d are less than the starting gauges 42a, 42b. Although the un-stretched regions or thicker ribs 44 of the multi-layered lightly-laminated films may be stretched to a small degree by MD intermeshing rollers 12,14 (or stretched in a separate operation), the un-stretched regions or thicker ribs 44 may be stretched significantly less compared to the stretched regions 46.

In any event, FIGS. 3A-3B illustrate that MD intermeshing rollers 12, 14 can process the initially separately layered films into MD incrementally-stretched multi-layered lightly-laminated films 15a. As previously mentioned, the MD incrementally-stretched multi-layered lightly-laminated films 15a can include a striped pattern 36 where the bonding occurs along a continuous line or region along the width of the film 15a, parallel to the TD direction. The striped pattern 36 can include alternating series of un-bonded regions 47 and bonded regions 49. The bonded regions 49 can comprise bonds between un-stretched regions or thicker ribs 44 of the films 10c, 10c'. In other words, the bonds of the MD incrementally-stretched multi-layered lightly-laminated films 15a can be positioned directly between, be aligned with, and bond together un-stretched regions or thicker ribs 44. Along related lines, the un-bonded regions 47 can separate the stretched or thinner regions 46.

Figure 4:
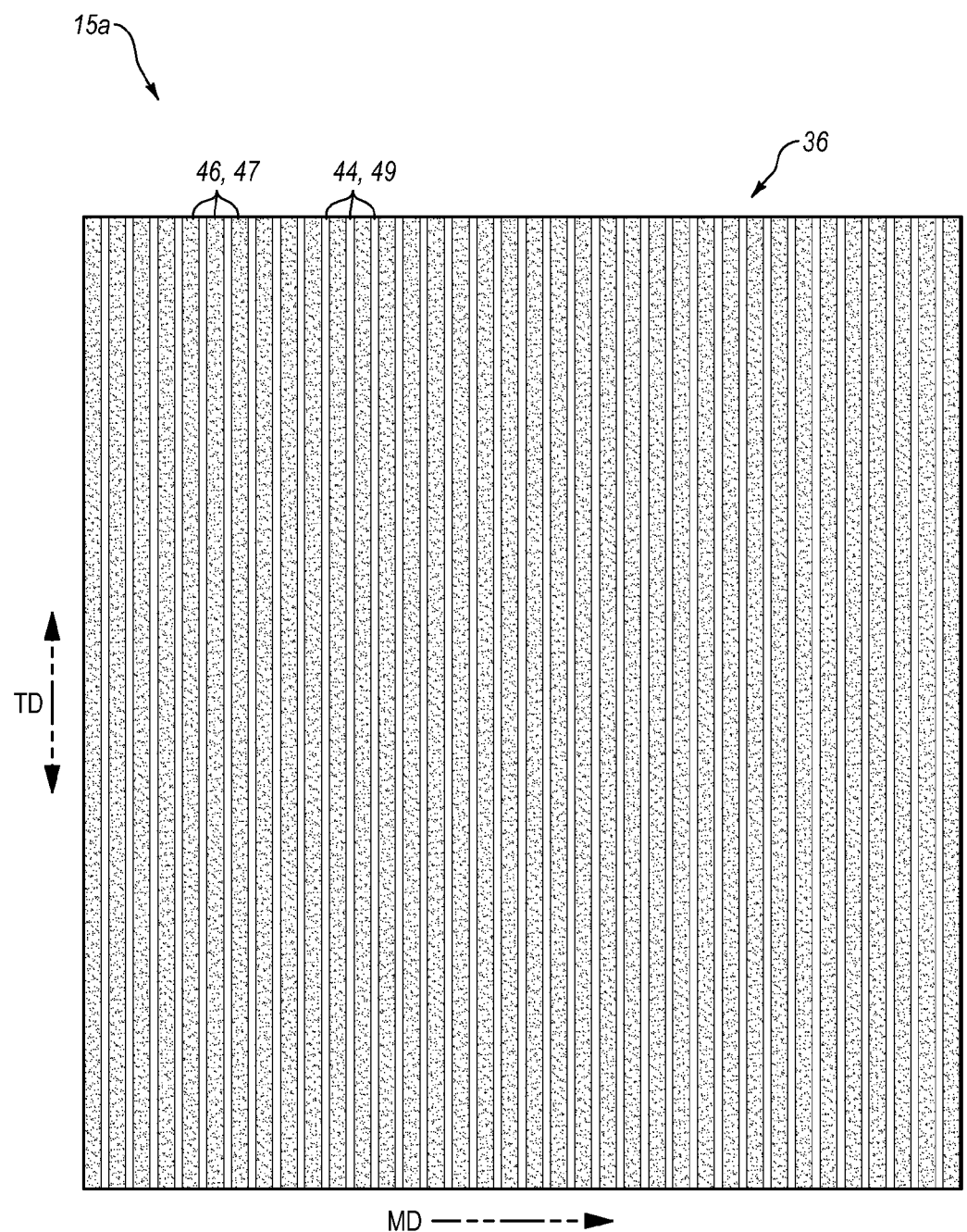
FIG. 4 illustrates a view of a multi-layered lightly-laminated thermoplastic film created by passing thermoplastic film through the intermeshing rollers of FIG. 3A.

FIG. 4 illustrates a top view of the MD incrementally-stretched and incrementally-bonded multi-layered lightly-laminated film 15a with maintained or decreased light transmittance. As shown by FIG. 4, the film 15a includes thicker ribs 44 bonded together to form bonded regions 49 adjacent to thinner regions 46 that form un-bonded regions 47. In addition to resulting in partially discontinuous lamination of adjacent layers, MD ring rolling the film 13 can increase or otherwise modify one or more of the tensile strength, tear resistance, impact resistance, or elasticity of the film 15a, in addition to whatever additional strength is provided by the partially discontinuous, low strength bonds between adjacent layers of the film. Such bonds can be broken to absorb forces rather than such forces resulting in tearing of the film.

Furthermore, thicker ribs 44 can include bonded stripes that extend across the film 15a in a direction transverse (i.e., transverse direction) to a direction in which the film was extruded (i.e., machine direction). As shown by FIG. 4, the bonded stripes or bonded regions 49 can extend across the entire length of the film 15a. One will appreciate in view of the disclosure herein that the striped pattern 36 may vary depending on the method used to incrementally stretch and partially discontinuously bond adjacent layers of film 13. To the extent that MD or other ring rolling is used to lightly bond the film 13, the striped pattern 36 (e.g., width and spacing of the stripes or stretched regions 44) on the film 13 can depend on the pitch 32 of the ridges 24, 26, the DOE 34, and other factors. As regions 49 represent areas of the multi-layer film in which the adjacent layers are lightly bonded to one another, it will be apparent that altering the spacing and/or width of regions 49 can affect the overall strength of the film. For example, providing more bonded surface area relative to the unbonded surface area can increase the density of such bonds that can absorb forces, increasing the film strength.

FIG. 4 further illustrates that the bonded regions 49 can be intermittently dispersed about un-bonded regions 47. In particular, each bonded region 49 can reside between adjacent un-bonded regions 47. Along related lines, each thicker rib 44 can be intermittently dispersed about stretched regions 46. Additionally, the bonded regions 49 and thicker ribs 44 can be visually distinct from the un-bonded regions 47 and thinner regions 46 as a result of stretching. The striped pattern 36 may vary depending on the method used to lightly laminate the film 13. In one or more implementations, the molecular structure of the thermoplastic material of the film multi-layered 13 may be rearranged during stretching (e.g., particularly so during cold stretching).

One will appreciate in view of the disclosure herein that passing the film 13 through the MD intermeshing rollers 12, 14 to form the MD incrementally-stretched multi-layered lightly-laminated film 15a can also modify the orientation of the film. In particular, MD stretching a predominately MD oriented film can further orient the stretched regions 46 in the machine direction. Thus, the stretched regions 46 can have an MD orientation that is greater than the MD orientation of the thicker ribs 44.

MD ring rolling is one exemplary method of partially discontinuously laminating a multi-layer film by incremental stretching of the film. TD ring rolling is another suitable method of discontinuously or partially discontinuously laminating a film. For example, FIGS. 5A-5D illustrates a TD ring rolling process that partially discontinuously and lightly bonds adjacent layers of a thermoplastic multi-layer film by passing the film through a pair of TD intermeshing rollers 52, 54.

Figure 5A:
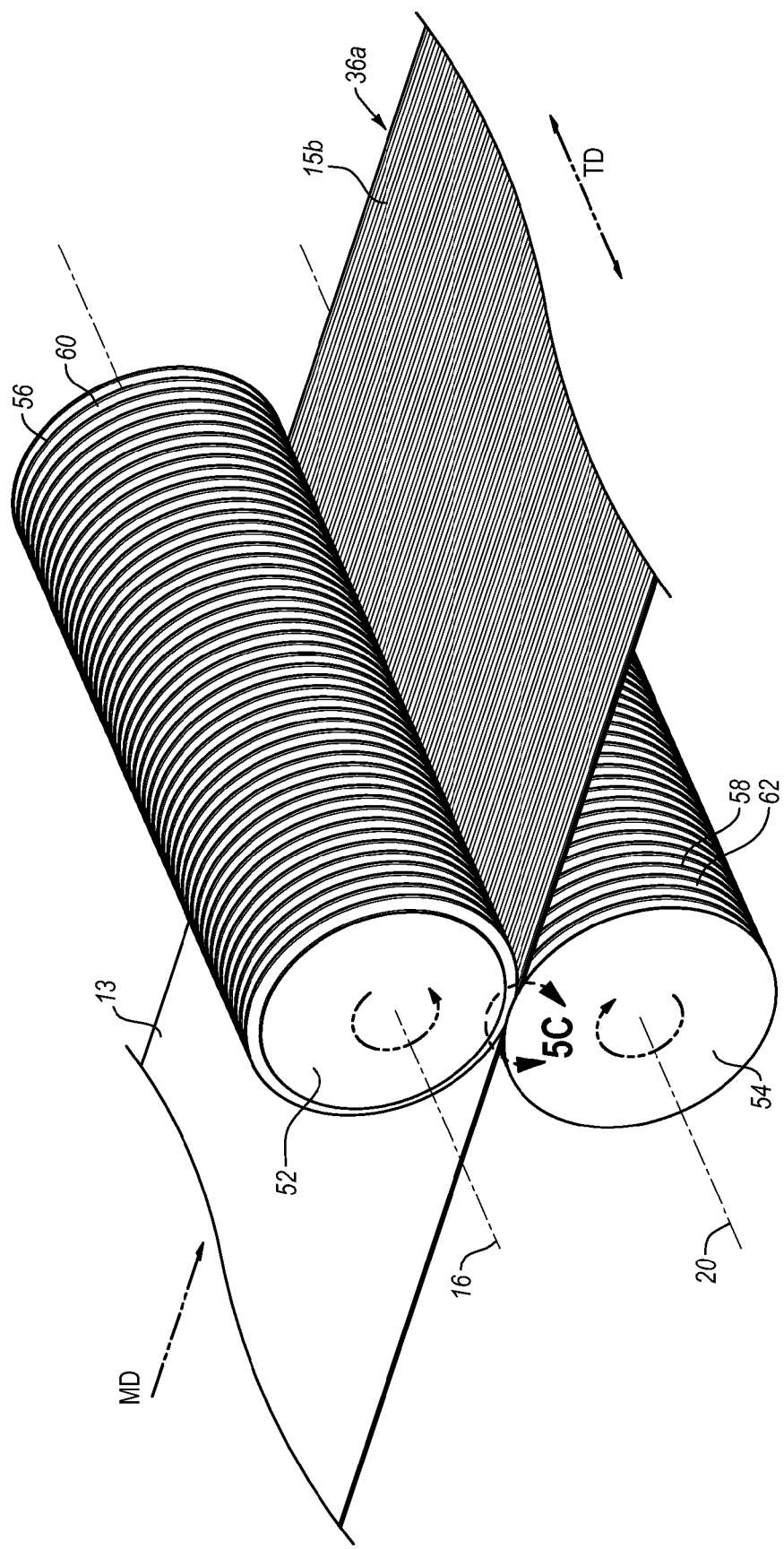
FIG. 5A a schematic diagram of two thermoplastic films being lightly laminated by TD intermeshing rollers in accordance with one or more implementations of the present invention.

A TD ring rolling process (and associated TD intermeshing rollers 52, 54) can be similar to the MD ring rolling process (and associated MD intermeshing rollers 12, 14) described herein above, except that the ridges 56, 58 and grooves 60, 62 of the TD intermeshing rollers 52, 54 extend generally orthogonally to the axes of rotation 16, 20 (i.e., parallel to the MD direction). Thus, as shown by FIG. 5A, as the thermoplastic film 13 passes between the intermeshing rollers 52, 54, the ridges 56, 58 can incrementally stretch and lightly bond adjacent layers of the multi-layer film 13. The resultant TD incrementally-stretched and incrementally-bonded multi-layered lightly-laminated film 15b with maintained or decreased light transmittance can include a striped pattern 36a within the with adjacent bonded and unbonded regions.

In particular, as the films 10c, 10c' proceed between the TD intermeshing rollers 52, 54, the ridges 56 of the first roller 52 can push the films 10c, 10c' into the grooves 62 of the second roller 54 and vice versa. The pulling of the films 10c, 10c' by the ridges 56, 58 can stretch the films 10c, 10c'. The rollers 52, 54 may not stretch the films 10c, 10c' evenly along their length. Specifically, the rollers 52, 54 can stretch the portions of the films 10c, 10c' between the ridges 56, 58 more than the portions of the films 10c, 10c' that contact the ridges 56, 58, or vice versa. Thus, the rollers 52, 54 can impart or form a ribbed pattern 36a into resultant multi-layered film.

The TD intermeshing rollers 52, 54 can form thick regions or thicker ribs 44a, thinner webs 46a, and bonds 49a in the films 10c, 10c'. In one or more implementations, the adjacent thick ribs 44a of the films 10c, 10c' can be joined by bonds 49a. In addition to forming ribs 46a, 44a and bonds 49a, TD ring rolling the films 10c, 10c' can increase or otherwise modify one or more of the tensile strength, tear resistance, impact resistance, or elasticity of the films 10c, 10c', in addition to whatever additional strength is provided by the partially discontinuous, bonds 49a between adjacent layers.

To the extent that TD or other ring rolling is used to lightly bond the films 10c, 10c', the ribbed pattern 36a (e.g., width and spacing of the ribs 46a, 44a) can depend on the pitch 32a of the ridges 56, 58, the DOE 34a, and other factors. As portions of the films 10c, 10c' including a ribbed pattern 36a also represent areas of the multi-layer film in which the adjacent layers are non-continuously bonded to one another, it will be apparent that altering the spacing and/or width of ribs 46a, 44a can affect the overall strength of the film. For example, providing more bonded surface area relative to the unbonded surface area can increase the density of such bonds 49a that can absorb forces, increasing the film strength.

Figure 5D:
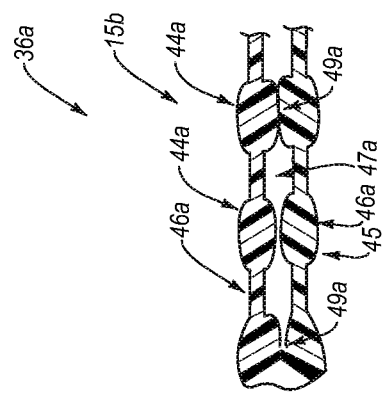
FIG. 5B illustrates the film prior to passing through the intermeshing rollers and FIG. 5D illustrates the film after passing through the intermeshing rollers in accordance with one or more implementations of the present invention.
Figure 5C:
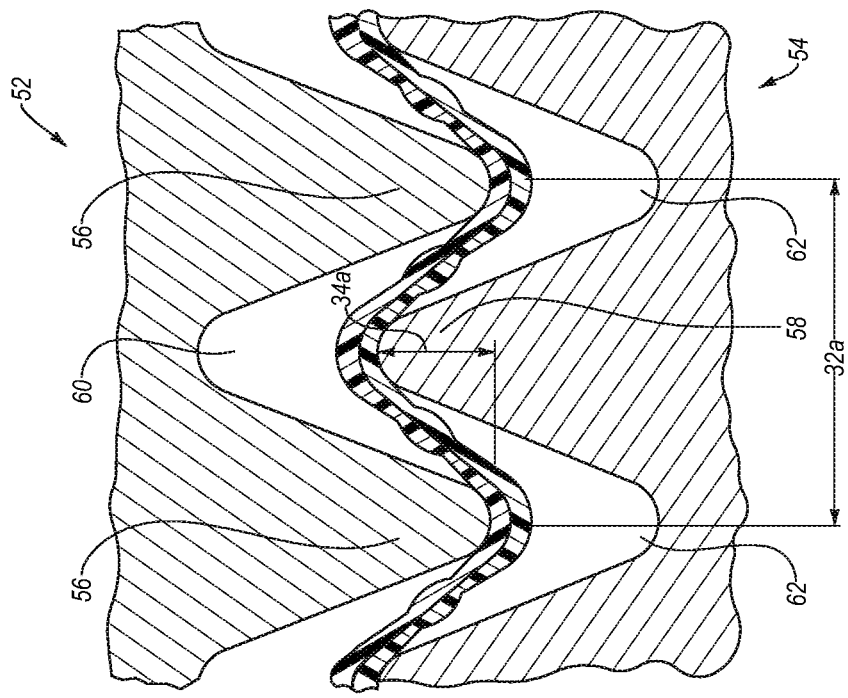
FIG. 5C illustrates an enlarged view of the two thermoplastic films passing together through the intermeshing rollers of FIG. 5A taken along the circle 5C of FIG. 5A to form a multi-layered lightly-laminated thermoplastic film.
Figure 5B:
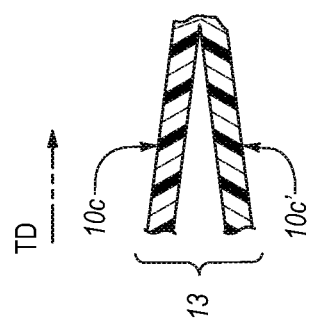

FIG. 5D further illustrates that the bonds 49a can bond thick linear ribs 44a of the layers 10c, 10c' together. In particular, the bonds 49a can be coextensive and aligned with opposing thicker ribs 44a and bond them together. FIG. 5D illustrates that the bonds 49a can secure some, but not all, of the thick linear ribs 44a of one layer to the thick linear ribs 44a of an adjacent layer. In particular, FIG. 5D illustrates that bonds 49a can secure every other thick linear rib 44a of adjacent layers together. The unbounded thicker ribs 44a can form unbounded regions 45. In alternative implementations, bonds 49a can secure each thick linear rib 44a of adjacent layer together.

Figure 6:
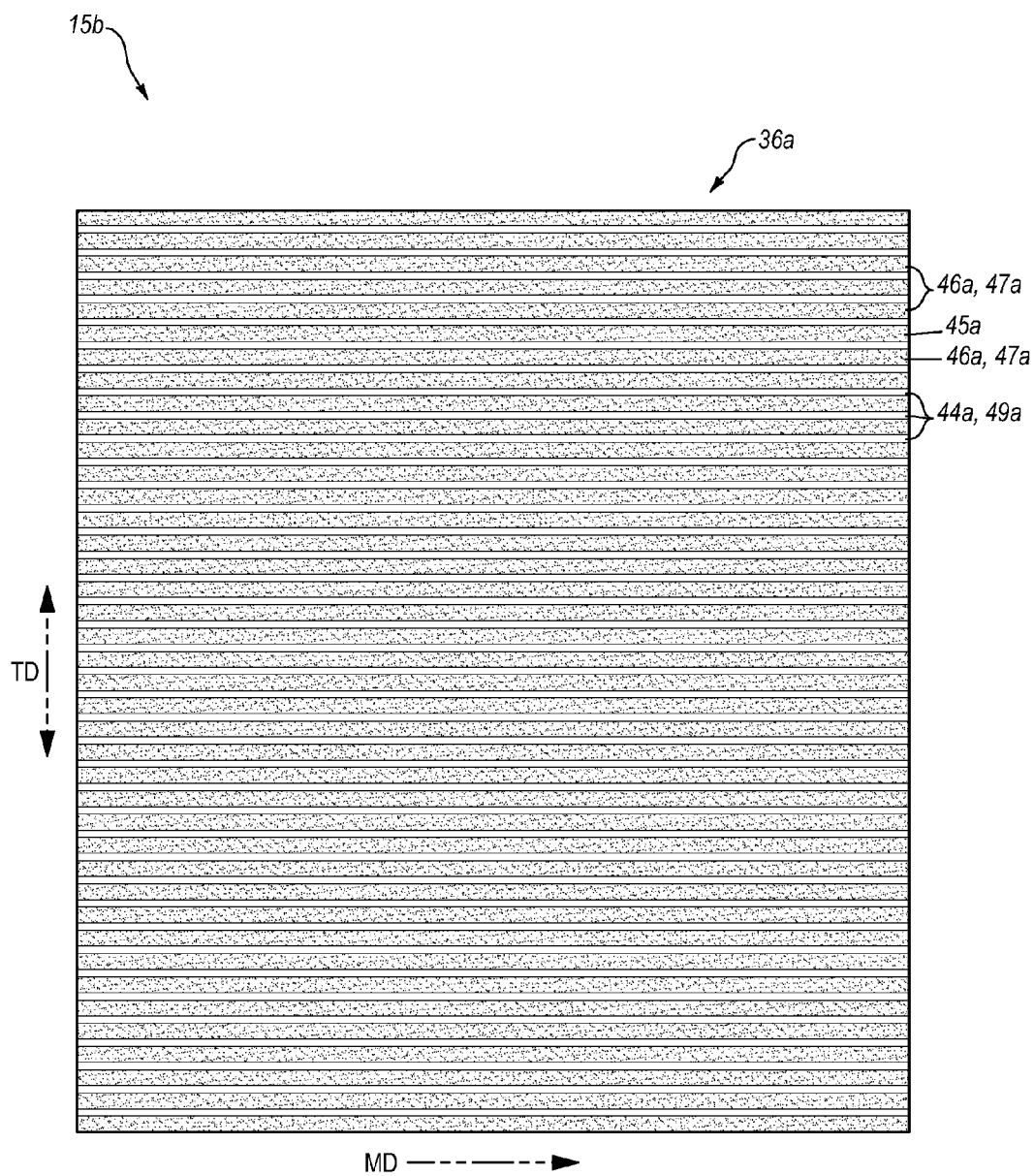
FIG. 6 illustrates a view of a multi-layered lightly-laminated thermoplastic film created by passing thermoplastic film through the intermeshing rollers of FIG. 5A.

FIG. 6 illustrates a top view of the TD incrementally-stretched and incrementally-bonded multi-layered lightly-laminated film 15b with maintained or decreased light transmittance. As shown by FIG. 6, the film 15b includes thicker ribs 44a bonded together to form bonded regions 49a adjacent to thinner regions 46a that form un-bonded regions 47a with bonded regions 46a and adjacent un-bonded regions 44a. Similar to MD ring rolling, TD ring rolling the multi-layered film 13 can result in relatively light, partially discontinuous bonding of adjacent layers 10c, 10c', increasing the strength of the multi-layer film 15b.

FIG. 6 illustrates that the bonded regions 49a can include stripes that extend across the multi-layered lightly-laminated film 15b in the machine direction. As shown by FIG. 6, the stripes or bonded regions 49a can extend across the entire width of the multi-layered lightly-laminated film 15b. In alternative implementations, bonded regions 49a can extend across only a portion of the multi-layered lightly-laminated film 15b. Similar to MD ring rolling, the pitch and the DOE of the ridges 56, 58 of the intermeshing rollers 52, 54 can affect the width and spacing of the stripes or bonded regions 49a, as well as the strength of the weak bonds formed between adjacent layers, thereby affecting the overall increase in strength provided by the processing.

Figure 7:
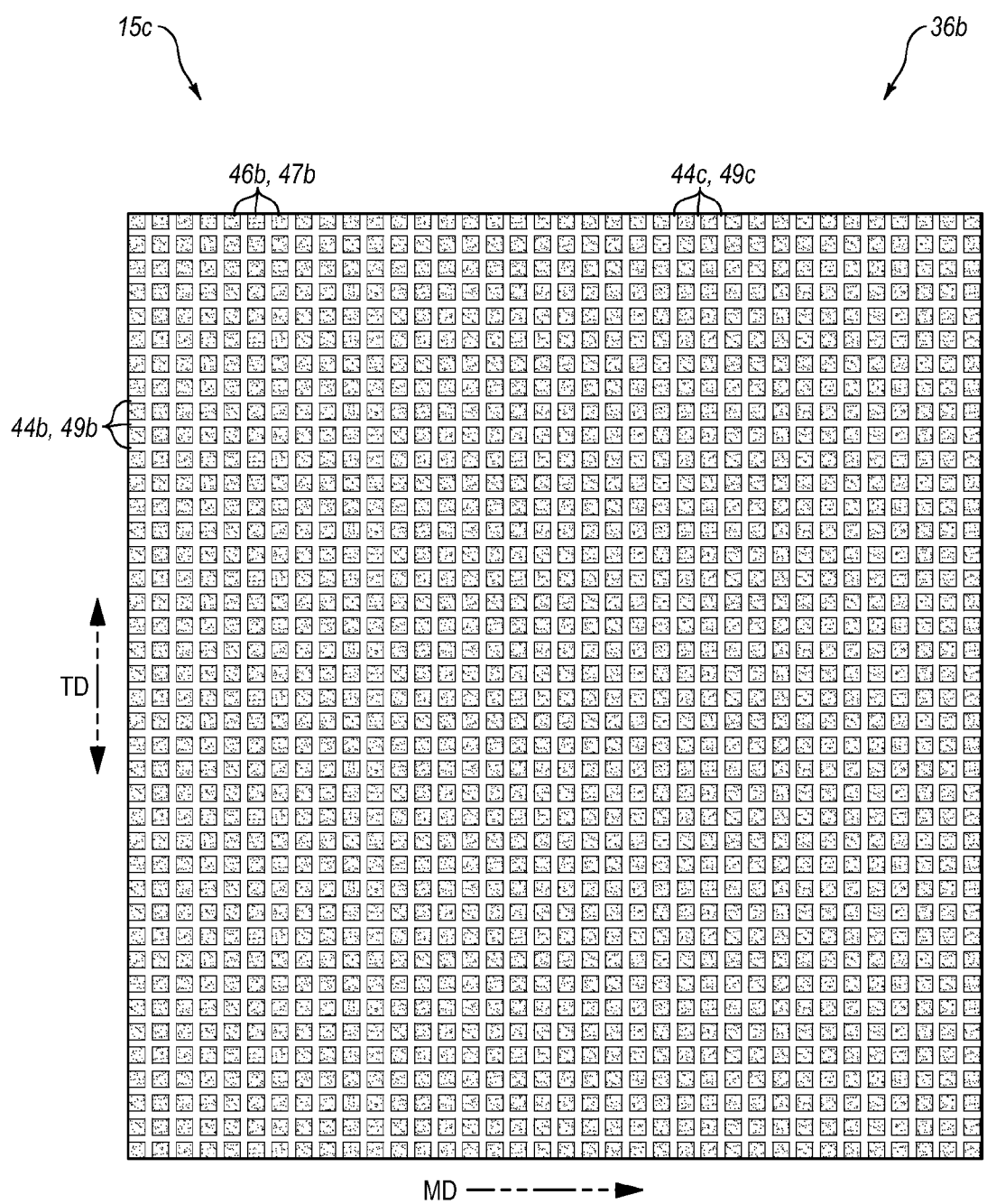
FIG. 7 illustrates a view of a multi-layered lightly-laminated thermoplastic film created by passing thermoplastic film through the intermeshing rollers of both FIG. 3A and FIG. 5A.

In still further implementations, a multi-layered film 13 can undergo both an MD ring rolling process and a TD ring rolling process to lightly bond the individual layers together. For example, FIG. 7 illustrates a top view of a MD & TD incrementally-stretched and incrementally-bonded multi-layered lightly-laminated film 15c with maintained or decreased light transmittance. The film 15c includes thicker ribs 44b, 44c bonded together to form bonded regions 49b, 49c adjacent to thinner regions 46b that form un-bonded regions 47b. The multi-layered lightly-laminated film 15c can have a grid pattern 36b including alternating series of un-bonded regions 47b and bonded regions 49b, 49c. In particular, un-bonded regions 47b may comprise a plurality of discrete squares or rectangles while the remainder of the surface comprises a grid of horizontal and vertical bonded regions that are connected together. The bonded regions 49b, 49c can include stripes 49b that extend along the multi-layered lightly-laminated film 15c in the machine direction, and stripes 49c that extend along the film in the transverse direction, which cross each other. As shown by FIG. 7, in one or more implementations, the aspect ratio of the rows and columns of the bonded regions 49b, 49c can be approximately 1 to 1. In alternative implementations, the aspect ratio of the rows and columns of –bonded regions 49b, 49c can be greater or less than 1 to 1, for example, as explained in greater detail in relation to FIG. 13.

The multi-layered lightly-laminated film 15c with bonded regions and adjacent un-bonded regions created by MD and TD ring rolling can allow for greater material savings by further increasing the surface area of a given portion of film, by increasing the density of light lamination bonds within a given area, and may also provide properties or advantages not obtained by MD or TD ring rolling alone.

Figure 8:
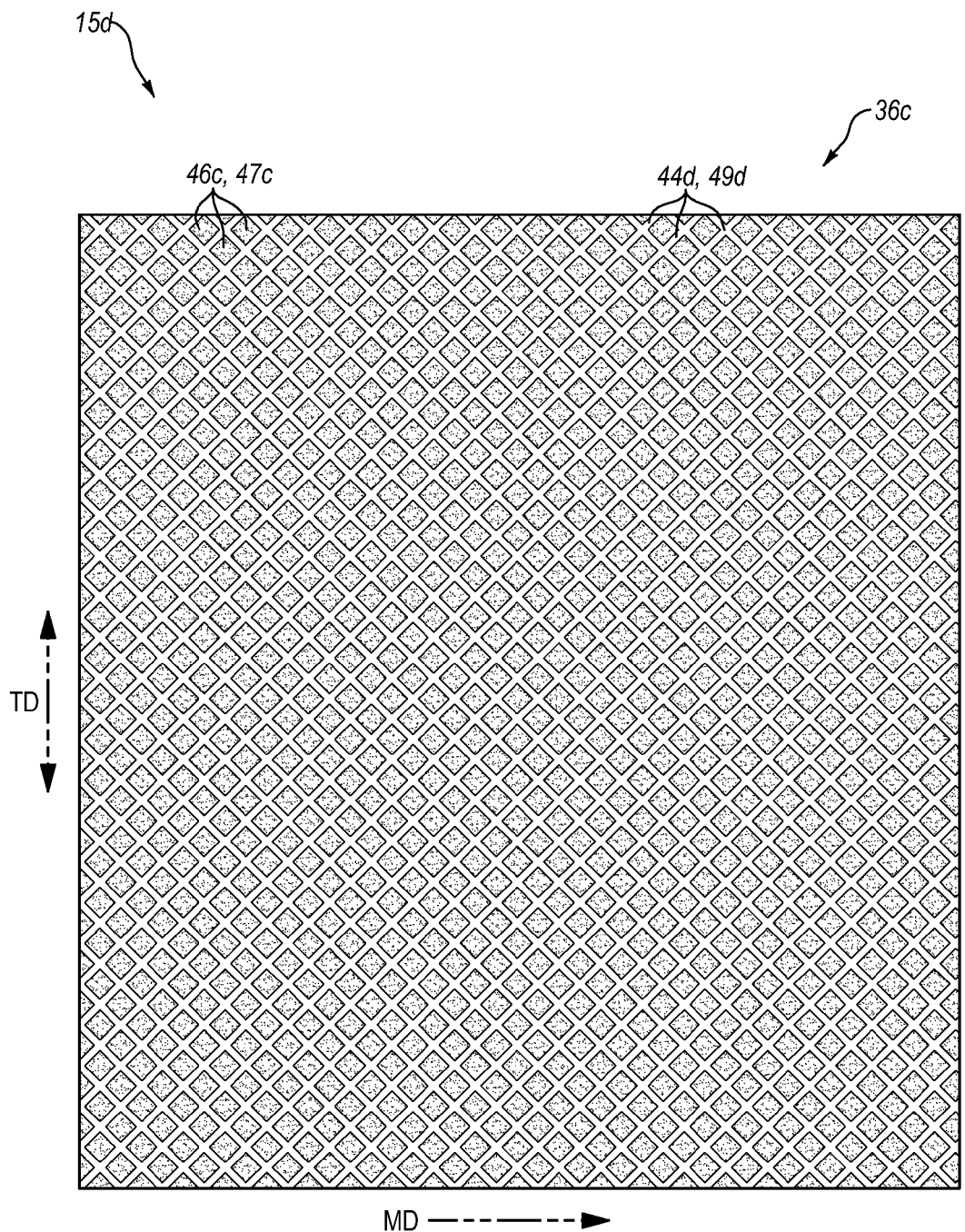
FIG. 8 illustrates a view of a multi-layered lightly-laminated thermoplastic film created by passing thermoplastic film through diagonal direction intermeshing rollers in accordance with one or more implementations of the present invention.

In yet further implementations, a manufacturer can use diagonal or helical (DD) ring rolling to lightly bond a thermoplastic film. DD ring rolling processes (and associated DD intermeshing rollers) can be similar to the MD ring rolling process (and associated MD intermeshing rollers 12, 14) described herein above, except that the ridges and grooves of the DD intermeshing rollers can extend at an angle relative to the axes of rotation. In particular, the ridges and grooves of the DD ring rollers can extend at an angle of between about 15 degrees and about 75 degrees relative to the axes of rotation (or the MD or TD directions). FIG. 8 illustrates a DD incrementally-stretched and incrementally-bonded multi-layered lightly-laminated film 15d with maintained or decreased light transmittance formed by lightly bonding two films together by passing the films through DD ring rollers. As shown the multi-layered lightly-laminated film 15d can have a diamond pattern 36c. The diamond pattern 36c can include alternating series of diamond-shaped thinner regions 46c defining un-bonded areas or regions 47c and thicker ribs 44a secured by bonds to form bonded regions 49d. The bonded regions can include stripes 49d oriented at an angle relative to the transverse direction such that the stripes 49d are neither parallel to the transverse or machine direction. The illustrated configuration may be achieved with two ring rolling operations, similar to that of FIG. 7, but in which the DD ring rollers of each operation are angularly offset relative to one another (e.g., one providing an angle of about 45° off of MD ring rolling, the other providing an angle of about 45° off of TD ring rolling). One will appreciate that DD ring rolling the film can biaxially orient the thinner, stretched regions 46c. In particular, orient the thinner, stretched regions 46c at an angle to the machine direction and the transverse direction.

In accordance with another implementation, a structural elastic like film (SELF) process may be used to create a thermoplastic film with strainable networks, which similarly results in discontinuous bonding of adjacent layers within a multi-layer film. As explained in greater detail below, the strainable networks can include adjacent bonded and un-bonded regions. U.S. Pat. No. 5,518,801; U.S. Pat. No. 6,139,185; U.S. Pat. No. 6,150,647; U.S. Pat. No. 6,394,651; U.S. Pat. No. 6,394,652; U.S. Pat. No. 6,513,975; U.S. Pat. No. 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 9:
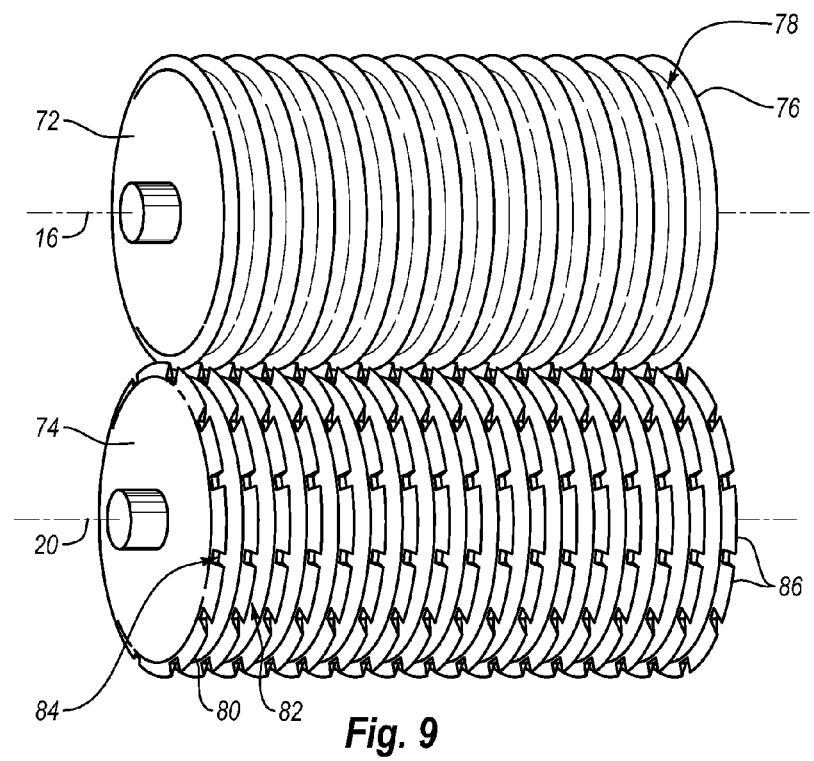
FIG. 9 illustrates a schematic diagram of a set of intermeshing rollers used to form a structural elastic like film (SELF) by imparting strainable networks into the film while lightly laminating adjacent layers of a film in accordance with one or more implementations of the present invention.

FIG. 9 illustrates a pair of SELF'ing intermeshing rollers 72, 74 for creating strainable networks with lightly bonded regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 9, however, the ridges 80 of the second SELF'ing intermeshing roller 74 can include a plurality of notches 84 that define a plurality of spaced teeth 86.

Figure 10:
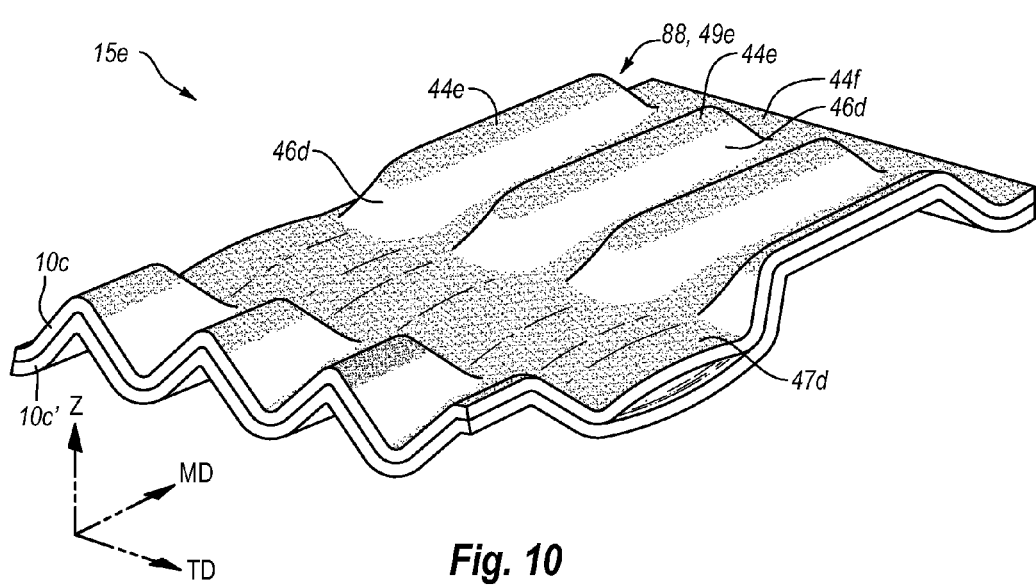
FIG. 10 illustrates a view of a multi-layered lightly-laminated thermoplastic film created by passing thermoplastic film through the intermeshing rollers of FIG. 9.

Referring now to FIG. 10, a multi-layered lightly-laminated film 15e with bonded regions dispersed about un-bonded regions created using the SELF'ing intermeshing rollers 72, 74 is shown. In particular, as the film passes through the SELF'ing intermeshing rollers 72, 74, the teeth 86 can press a portion of the multi-layer web or film out of plane to cause permanent deformation of a portion of the film in the Z-direction. The portions of the film that pass between the notched regions 84 of the teeth 86 will be substantially unformed in the Z-direction, resulting in a plurality of deformed, raised, rib-like elements 88. The length and width of rib-like elements 88 depends on the length and width of teeth 86.

As shown by FIG. 10, the strainable network of the multi-layered lightly-laminated film 15e can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88 of the strainable network. In one or more embodiments, the rib-like elements 88 can comprise bonded regions 49e can be discontinuous or separated as they extend across the multi-layered film 15e in both transverse and machine directions. This is in contrast to stripes that extend continuously across a film in one of the machine or transverse directions.

The rib-like elements 88 can allow the multi-layered lightly-laminated film 15e to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations of multi-layered lightly-laminated film 15e that are generally discernible to the normal naked eye when the multi-layered film 15e or articles embodying the multi-layered lightly-laminated film 15e are subjected to an applied strain. Types of geometric deformation include, but are not limited to bending, unfolding, and rotating.

Thus, upon application of strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the multi-layered film 15e. Geometric deformation can result in significantly less resistive forces to an applied strain than that exhibited by molecular-level deformation.

In addition to improved properties thus provided by the ability to geometrically deform, the SELF'ing process also discontinuously and lightly laminates adjacent layers of the multi-layer film together, providing the benefits noted above. In particularly, the film layers 10c, 10c' can be lightly laminated at regions 49e, but un-bonded at regions 47d. The strength of the lamination bond is relatively weak, so as to be less than the weakest tear resistance of the individual layers of the multi-layer film. Thus, the lamination bond is broken rather than the individual layer tearing upon application of a force. Typically, tearing in the MD direction requires less applied force than tearing in the TD direction, thus in one embodiment, the lamination bond strength is less than the MD tear resistance of each individual layer of the multi-layer film.

Figure 11:
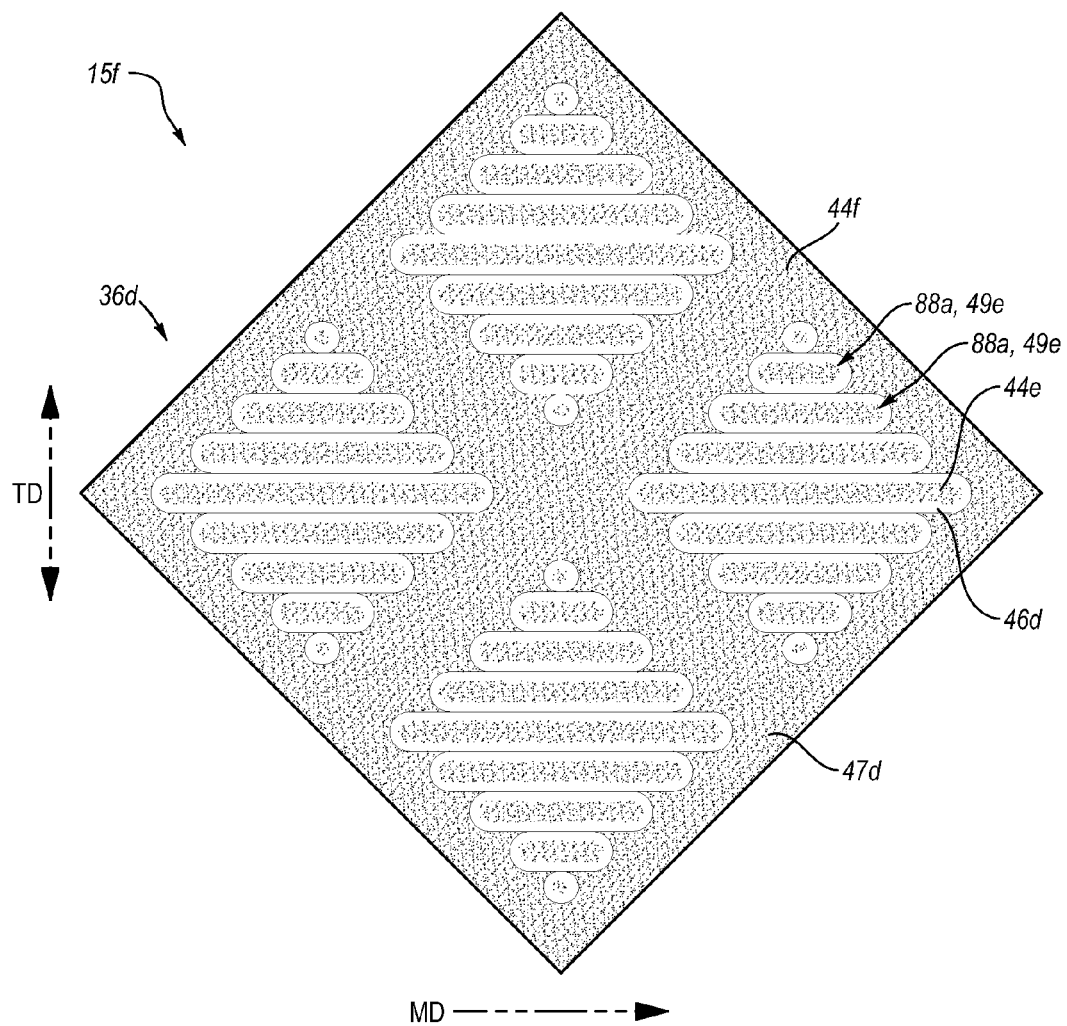
FIG. 11 illustrates a view of another multi-layered lightly-laminated thermoplastic film including strainable networks in accordance with one or more implementations of the present invention.

FIG. 11 illustrates a multi-layered lightly-laminated film 15f with a strainable network of rib-like elements 88a arranged in diamond patterns. The strainable network of the multi-layered lightly-laminated film 15f can include first thicker regions 44e, second thicker regions 44f, stretched, thinner transitional regions 46d connecting the first and second thicker regions 44e, 44f. The first thicker regions 44e and the stretched, thinner regions 46d can form the raised rib-like elements 88a of the strainable network. In one or more embodiments, the rib-like elements 88a can comprise bonded regions 49e.

One or more implementations of the present invention can include strainable network patterns other than those shown by FIGS. 10 and 11, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine nor transverse directions.

One will appreciate in view of the disclosure herein that using ring rolling and/or SELFing to form the weak bonds can provide the additional benefit of stretching the film layers, thereby reducing the basis weight of the multi-layered lightly-laminated film. Thus, using incremental stretching to form the weak bonds can allow for multi-layer films at a lower basis weight (amount of raw material) to perform the same as or better than higher basis weight mono-layer or co-extruded films.

In addition to ring rolling and SELFing, one or more implementations include using embossing, stamping, adhesive lamination, ultrasonic bonding, or other methods of lightly laminating layers of a multilayer film. In such implementations, one or more of the layers of the multi-layered lightly-laminated film can be stretched to reduce the basis weight and/or modify the strength parameters of the film prior to lamination. Stretching of the individual layers can include incrementally-stretching (e.g., ring rolling, SELFing) or continuous stretching (e.g., MDO).

As alluded to earlier, including differing opacity agents in layers of a multi-layer can maintain or decrease light transmittance of the multi-layer film despite a reduction in gauge and an overall reduction of opacity agents. The following example presents the results of a series of tests performed on thermoplastic films. These examples are illustrative of the invention claimed herein and should not be construed to limit in any way the scope of the invention.

EXAMPLES

In examples 1-12 each of the films are hexene linear-low density polyethylene and the list percentages of opacity agents (i.e., master batch white or black). Thus, if a film is noted as having 6% masterbatch in the core, the film would also include 94% hexene LLDPE in the core and 100% hexene LLDPE in the skins. Similarly if a film is noted as having 0.50 masterbatch in the skins, the film would also include 99.50% hexene LLDPE in the skins and 100% hexene LLDPE in the core.

In a first example, a 0.45 mil, three-layer film with a 20:60:20 layer ratio containing 6% white masterbatch in the core layer was extruded (i.e., white layer). Separately, a 0.45 mil, three layer film with a 20:60:20 layer ratio containing 0.75% carbon black masterbatch in the skin layers was extruded (i.e., black layer). While the second film is referred to herein as a black layer, one will appreciate in view of the disclosure herein that due to the small amount of carbon black masterbatch, the "black layer" appears like a cloudy gray clear or transparent film. The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge by weight of the laminated structure was measured to be 0.73 mils. The light transmission of this laminated structure (herein referred to as structure 1A) was measured using a BYK Garner Haze-Gard Plus unit following ASTM D-1003 (Haze and Luminous Transmittance of Transparent Plastics) and found to be 61.9%. The total white masterbatch concentration of this structure is 1.80%.

In a second example, the same two base films of Example 1 were discontinuously laminated at the same conditions, but with the white C-folded web inserted into the black C-folded web. The gauge-by-weight of the laminated structure (herein referred to as structure 1B) was essentially the same as laminated structure 1A (measured to be 0.72 mils), but the light transmission increased to 66.2%. The total white masterbatch concentration of this structure is 1.80%.

In a third example, a 0.45 mil, three-layer film with a 20:60:20 layer ratio containing 6% white masterbatch in the core layer was extruded (i.e., white layer). Separately, a 0.45 mil, three layer film with a 20:60:20 layer ratio containing 0.50% carbon black masterbatch in the skin layers was extruded (i.e., black layer). The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge-by-weight of the laminated structure (herein referred to as structure 2A) was measured to be 0.74 mils. The light transmission of this laminated structure was measured and found to be 64.9%. The total white masterbatch concentration of this structure is 1.80%.

In a fourth example, the same two base films of Example 3 were discontinuously laminated at the same conditions, but with the white C-folded web inserted into the black C-folded web. The gauge-by-weight of the laminated structure (herein referred to as structure 2B) was essentially the same as laminated structure 2A (measured to be 0.76 mils), but the light transmission increased to 70.0%. The total white masterbatch concentration of this structure is 1.80%.

In a fifth example, a 0.45 mil, three-layer film with a 20:60:20 layer ratio containing 6% white masterbatch in the core layer was extruded (i.e., white layer). Separately, a 0.45 mil, three-layer film with a 20:60:20 layer ratio containing 0.25% carbon black masterbatch in the skin layers was extruded (i.e., black layer). The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge-by-weight of the laminated structure (herein referred to as structure 3A was measured to be 0.75 mils. The light transmission of this laminated structure was measured and found to be 66.9%. %. The total white masterbatch concentration of this structure is 1.80%

In a sixth example, the same two base films of Example 5 were discontinuously laminated at the same conditions, but with the white C-folded web inserted into the black C-folded web. The gauge-by-weight of the laminated structure (herein referred to as structure 3B) was the same as the laminated structure 3A (measured to be 0.75 mils), but the light transmission increased to 71.2%. The total white masterbatch concentration of this structure is 1.80%.

In a seventh example, a 0.45 mil, three-layer film with a 20:60:20 layer ratio containing 4% white masterbatch in the core layer was extruded (i.e., white layer). Separately, a 0.45 mil, three-layer film with a 20:60:20 layer ratio containing 0.75% carbon black masterbatch in the skin layers was extruded (i.e., black layer). The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge-by-weight of the laminated structure was measured to be 0.72 mils. The light transmission of this laminated structure (herein referred to as structure 4A) was measured and found to be 64.5%. The total white masterbatch concentration of this structure is 1.2%.

In a eighth example, the same two base films of Example 7 were discontinuously laminated at the same conditions, but with the white C-folded web inserted into the black C-folded web. The gauge-by-weight of the laminated structure (herein referred to as structure 4B) was essentially the same as the laminated structure 4A (measured to be 0.73 mils), but the light transmission increased to 69.7%. The total white masterbatch concentration of this structure is 1.2%.

In a ninth example, a 0.45 mil, three-layer film with a 20:60:20 layer ratio containing 4% white masterbatch in the core layer was extruded (i.e., while layer). Separately, a 0.45 mil, three-layer film with a 20:60:20 layer ratio containing 0.50% carbon black masterbatch in the skin layers was extruded (i.e., black layer). The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge-by-weight of the laminated structure (herein referred to as structure 5A) was measured to be 0.75 mils. The light transmission of this laminated structure was measured and found to be 69.7%. The total white masterbatch concentration of this structure is 1.2%.

In a tenth example, the same two base films of Example 9 were discontinuously laminated at the same conditions, but with the white C-folded web inserted into the black C-folded web. The gauge-by-weight of the laminated structure (herein referred to as structure 5B) was slightly thicker than same as the laminated structure 5A (measured to be 0.77 mils), but the light transmission increased to 72.8%. The total white masterbatch concentration of this structure is 1.2%.

In an eleventh example, a 0.45 mil, three-layer film with a 20:60:20 layer ratio containing 4% white masterbatch in the core layer was extruded (i.e., white layer). Separately, a 0.45 mil, three-layer film with a 20:60:20 layer ratio containing 0.25% carbon black masterbatch in the skin layers was extruded (i.e., black layer). The two films were discontinuously laminated by having the black C-folded web inserted into the white C-folded web followed by MD ring rolling at 190 DOE with a 200 pitch tool and then TD ring rolled at 30 DOE with a 40 pitch tool. The gauge-by-weight of the laminated structure (herein referred to as structure 6A) was measured to be 0.76 mils. The light transmission of this laminated structure was measured and found to be 71.7%. The total white masterbatch concentration of this structure is 1.2%.

In a twelfth example, the same two base films of Example 11 were discontinuously laminated at the same conditions, but with the white C-folded web inserted into the black C-folded web. The gauge-by-weight of the laminated structure (herein referred to as structure 6B) was essentially the same as the laminated structure 6A (measured to be 0.75 mils), but the light transmission increased to 76.0%. The total white masterbatch concentration of this structure is 1.2%.

Table 1 lists properties of these films along with the properties of a control film. The control film is a 0.90 mil thermoplastic film. The control film is a co-extruded 20:60:20 layer ratio containing 5% white masterbatch (white pigment) in the core layer. The total concentration of white masterbatch for the control film is 3.0%. The total light transmittance is 72%. The control film is a common film used in trash bags. The control film is considered a quality film in terms of strength and light transmittance.

TABLE 1

| Structure ID | GBW (mils) | Total While Conc. (%) | Light Trans. (%) | Haze (%) | Outer Layer | Outer Layer Pigment Conc. (%) | Inner Layer | Inner Layer Pigment Conc. (%) |
|---|---|---|---|---|---|---|---|---|
| Control | 0.90 | 3.0 | 72.00 | | White | 5.00 | n/a | n/a |
| 1A | 0.73 | 1.80 | 61.90 | 90.10 | White | 6.00 | Black | 0.75% |
| 1B | 0.72 | 1.80 | 66.20 | 91.00 | Black | 0.75 | White | 6.00% |
| 2A | 0.74 | 1.80 | 64.90 | 91.40 | White | 6.00 | Black | 0.50% |
| 2B | 0.76 | 1.80 | 70.00 | 91.80 | Black | 0.50 | White | 6.00% |
| 3A | 0.75 | 1.80 | 66.90 | 91.50 | White | 6.00 | Black | 0.25% |
| 3B | 0.75 | 1.80 | 71.20 | 92.10 | Black | 0.25 | White | 6.00% |
| 4A | 0.72 | 1.20 | 64.50 | 87.20 | White | 4.00 | Black | 0.75% |
| 4B | 0.73 | 1.20 | 69.70 | 87.10 | Black | 0.75 | White | 4.00% |
| 5A | 0.75 | 1.20 | 69.70 | 87.50 | White | 4.00 | Black | 0.50% |
| 5B | 0.77 | 1.20 | 72.80 | 88.10 | Black | 0.50 | White | 4.00% |
| 6A | 0.76 | 1.20 | 71.70 | 87.50 | White | 4.00 | Black | 0.25% |
| 6B | 0.75 | 1.20 | 76.00 | 88.30 | Black | 0.25 | White | 4.00% |

The results from Table 1 indicate that some of the incrementally-stretched and discontinuously-laminated films under certain conditions can have a maintained or decreased light transmittance compared to the control film despite a reduction in both gauge and overall opacity agents. In particular, as shown in Table 1, the incrementally-stretched and discontinuously-laminated films were generally 20% thinner and contained between 40% and 60% less white pigment compared to the control film. Nonetheless, several of the incrementally-stretched and discontinuously-laminated films had maintained or decreased light transmittance compared to the control film. One will appreciate in view of the disclosure herein that the reduction of material and pigment provided by incrementally-stretched and discontinuously-laminated films of one or more embodiments can provide a considerable advantage over conventional films.

Additionally, the results from Table 1 further illustrate that the order of the layers containing the different opacity layers can play a significant, yet unexpected role in the light transmittance of the resultant incrementally-stretched and discontinuously-laminated films. In particular, Table 1 shows that when the outer layer contains the light reflecting opacity agent (e.g., white pigment) and inner layer contains the light absorbing opacity agent (e.g., black pigment), the light transmittance unexpectedly was lower than when the outer layer included the light absorbing opacity agent.

Table 2 shown below illustrates the light transmittance, haze, and gauge of the individual layers of film user to create the laminate structures included in Table 1. Table 2 includes values for the plies or layers of film both in an un-stretched state and a stretched state.

TABLE 2

| ID | Ply ID | Single Plies Un-Stretched | | | | | Single Plies Stretched | | | Pigment Conc. |
|----|--------|---------------------------|---|---|---|---|------------------------|---|---|---------------|
| | | Gauge (Mils) | Light Trans (%) | Haze (%) | MD DOE (Mils) | TD DOE (Mils) | Est. Gauge (Mils) | Light Trans (%) | Haze (%) | |
| 1A | I | 0.45 | 73.20 | 85.40 | 190 | 30 | 0.37 | 80.50 | 80.40 | 6.00% White |
| | II | 0.45 | 80.50 | 43.70 | | | 0.37 | 82.50 | 56.30 | 0.75% Black |
| 1B | II | 0.45 | 80.50 | 43.70 | 190 | 30 | 0.36 | 82.80 | 56.30 | 0.75% Black |
| | I | 0.45 | 73.20 | 85.40 | | | 0.36 | 80.10 | 80.30 | 6.00% White |
| 2A | I | 0.45 | 73.20 | 85.40 | 190 | 30 | 0.37 | 79.50 | 81.50 | 6.00% White |
| | III | 0.45 | 84.60 | 44.90 | | | 0.37 | 86.90 | 58.80 | 0.50% Black |
| 2B | III | 0.45 | 84.60 | 44.90 | 190 | 30 | 0.38 | 86.60 | 58.00 | 0.50% Black |
| | I | 0.45 | 73.20 | 85.40 | | | 0.38 | 80.00 | 79.70 | 6.00% White |
| 3A | I | 0.45 | 73.20 | 85.40 | 190 | 30 | 0.38 | 79.70 | 81.70 | 6.00% White |
| | IIII | 0.45 | 88.40 | 39.60 | | | 0.38 | 89.00 | 59.20 | 0.25% Black |
| 3B | IIII | 0.45 | 88.40 | 39.60 | 190 | 30 | 0.38 | 88.70 | 58.00 | 0.25% Black |
| | I | 0.45 | 73.20 | 85.40 | | | 0.38 | 78.60 | 82.80 | 6.00% White |
| 4A | V | 0.45 | 81.20 | 73.90 | 190 | 30 | 0.36 | 83.40 | 74.60 | 4.00% White |
| | II | 0.45 | 80.50 | 43.70 | | | 0.36 | 82.50 | 56.00 | 0.75% Black |
| 4B | V | 0.45 | 80.50 | 43.70 | 190 | 30 | 0.37 | 82.80 | 53.40 | 0.75% Black |
| | II | 0.45 | 81.20 | 73.90 | | | 0.37 | 83.40 | 74.20 | 4.00% White |
| 5A | V | 0.45 | 81.20 | 73.90 | 190 | 30 | 0.38 | 83.90 | 73.60 | 4.00% White |
| | III | 0.45 | 84.60 | 44.90 | | | 0.38 | 87.20 | 58.40 | 0.50% Black |
| 5B | III | 0.45 | 84.60 | 44.90 | 190 | 30 | 0.39 | 86.70 | 57.80 | 0.50% Black |
| | V | 0.45 | 81.20 | 73.90 | | | 0.39 | 82.70 | 75.80 | 4.00% White |
| 6A | V | 0.45 | 81.20 | 73.90 | 190 | 30 | 0.38 | 83.90 | 73.50 | 4.00% White |
| | IIII | 0.45 | 88.40 | 39.60 | | | 0.38 | 88.90 | 57.10 | 0.25% Black |
| 6B | IIII | 0.45 | 88.40 | 39.60 | 190 | 30 | 0.38 | 89.10 | 58.00 | 0.25% Black |
| | V | 0.45 | 81.20 | 73.90 | | | 0.38 | 84.00 | 73.30 | 4.00% White |

As shown by Table 2 incrementally stretching the films both reduces the gauge and increases the light transmittance. The increase in light transmittance is expected in the incrementally stretched films because the films are thinner.

One will appreciate in view of the disclosure herein that the lightly bonded multi-layered films described above can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include lightly bonded multi-layer films to one extent or another. The films and methods of the present invention may particularly benefit trash bags and food storage bags.

Figure 12:
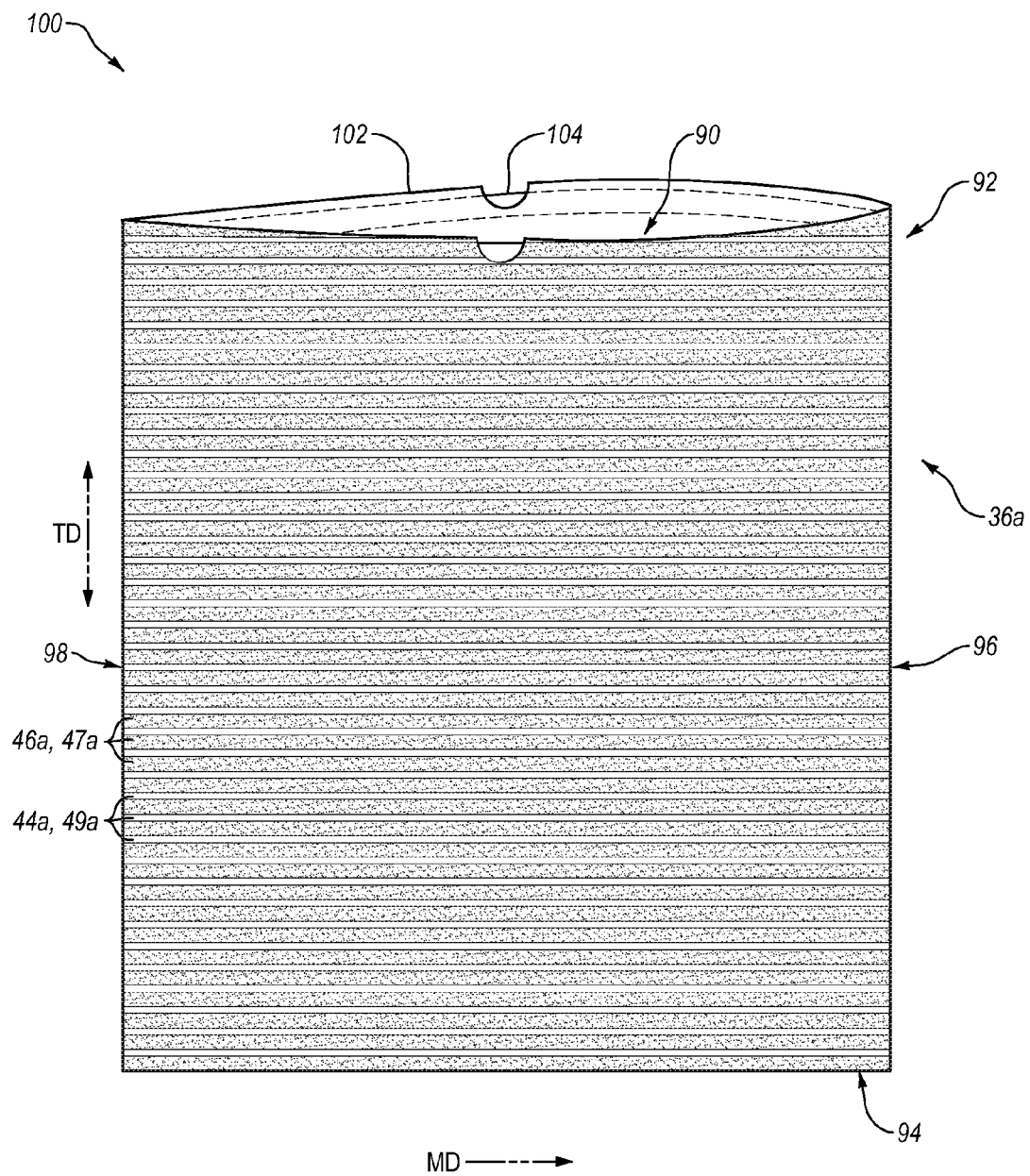
FIG. 12 illustrates a bag incorporating the multi-layered lightly-laminated film of FIG. 6 in accordance with one or more implementations of the present invention.

Referring to FIG. 12, the multi-layer film 15b with maintained or decreased light transmittance illustrated in FIG. 6 is incorporated in a flexible draw tape bag 100. The bag 100 can include a bag body 92 formed from a piece of incrementally-stretched adhesively-laminated film 15b folded upon itself along a bag bottom 94. Side seams 96 and 98 can bond the sides of the bag body 92 together to form a semi-enclosed container having an opening 90 along an upper edge 102. The bag 100 also optionally includes closure means 104 located adjacent to the upper edge 102 for sealing the top of the bag 100 to form a fully-enclosed container or vessel. The bag 100 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include two film layers with thicker regions 44a that are bonded 49a and stretched regions 46a that are un-bonded. Both the bonded, thicker regions 44a, 49a and the stretched, unbounded regions 46a, 47a can form of stripes. The stripes can extend across the multi-layered bag 100 in the MD direction, or in other words, from the first side seam 96 to the second side seam 98. The multi-layered bag 100 can require less material to form than an identical bag formed with film 13 (not discontinuously laminated/incrementally stretched) of the same thermoplastic material. Additionally, despite requiring less material, the multi-layered bag 100 includes improved strength properties imparted by lightly bonding adjacent layers of the multi-layer film together. Additionally, despite requiring less material, the bag 100 can have the same or lesser light transmittance than an identical bag formed with an un-stretched film of the same thermoplastic material. The maintained or decreased light transmittance can cause the bag 90 to appear thicker and stronger. Additionally, the maintained or decreased light transmittance can prevent or reduce the ability to see the contents within the bag 100.

Furthermore, a bag 100 formed from a multi-layered lightly-laminated film can have a first layer of thermoplastic material. The first layer can include first and second side walls joined along a bottom edge, a first side edge, and an opposing second side edge. In particular, the bottom edge of the first layer can comprise a fold. The bag 100 can also include a second layer of thermoplastic material. The second layer can include including first and second side walls joined along a bottom edge, a first side edge, and an opposing second side edge. The second layer is positioned within the first layer. Furthermore, the first and the second layer are weak bonded to each other and incrementally stretched.

In one or more implementations, as mentioned above, the outer layer of the bag (e.g., any of bags 100-100h) can comprise a film with a first opacity agent. In particular, in one or more embodiments the first opacity agent can comprise a white pigment. The inner layer of the bag can comprise a second film with a second opacity agent differing from the first opacity agent. In particular, in one or more embodiments the second opacity agent can comprise a black pigment. The inner layer can have a blurry or gray transparent appearance due to the inclusion of only a small amount of black pigment. When viewed from the outside the bag can appear off-white. The combination of the inner and outer layers of the bag (e.g., any of bags 100-100h) with the differing opacity agents can provide the bag (e.g., any of bags 100-100h) with decreased or maintained light transmittance despite a reduction in gauge and an overall amount of opacity agents.

Figure 13:
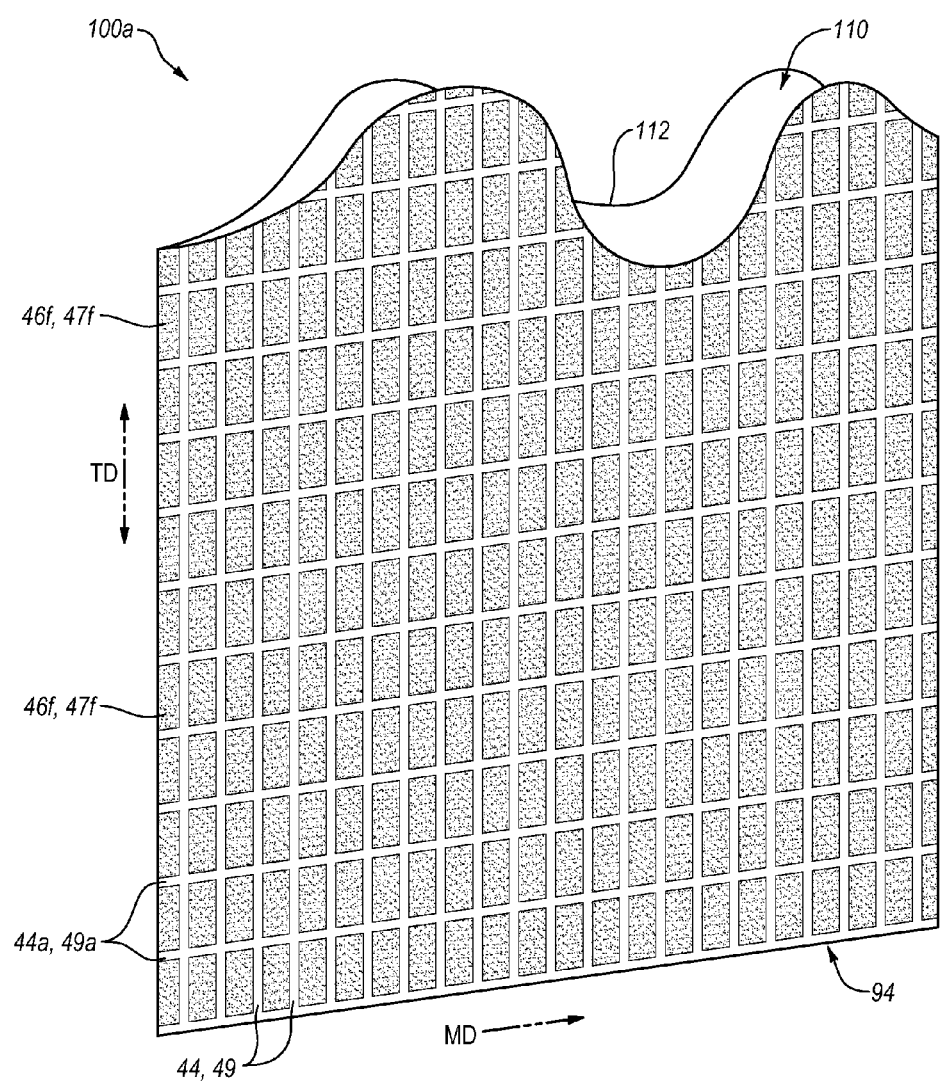
FIG. 13 illustrates a bag incorporating a multi-layered lightly-laminated film in accordance with one or more implementations of the present invention.

FIG. 13 illustrates a multi-layered tie bag 100a incorporating a multi-layered lightly-laminated film in accordance with an implementation of the present invention. As shown, the sides of the tie bag 100a can include a pattern of un-bonded, regions 47f and bonded regions 49, 49a created by MD and TD ring rolling. The lightly bonded regions can include stripes that extend across the bag 100a in the machine direction. Additionally, the bonded regions can include stripes that extend across the bag 100a in the transverse direction, or in other words from the bag bottom 108 to flaps 110 of an upper edge 112 of the multi-layered bag 100a. Bonded regions 49, 49a are characterized by relatively weak bonding of adjacent layers of the multi-layer film, which acts to absorb forces into breaking of the lamination bond rather than allowing that same force to cause tearing of either of the layers of the multi-layer film. Such action provides significantly increased strength to the multi-layer film as compared to a monolayer similar thickness film or compared to a multi-layer film of similar thickness where the layers are strongly bonded together (i.e., at a bond strength at least as great as the tear resistance of the weakest layer). The lamination bond includes a bond strength that is advantageously less than the tear resistance of each of the individual films so as to cause the lamination bond to fail prior to tearing of the film layers.

In comparison with the film 15c of FIG. 7, the spacing between the MD extending thicker ribs or regions 44a are greater in the multi-layered bag 100a. Using MD ring rolls having a greater pitch between ridges creates this effect. Similarly, the spacing of the TD extending thicker ribs 44 is greater in the multi-layered bag 100a than the multi-layered film 15c. Using TD ring rolls having a greater pitch between ridges creates this effect. Furthermore, the relative spacing between the MD extending stripes and the TD extending stripes differs in the multi-layered bag 100a, while relative spacing is the same in the multi-layered film 15c. This effect is created by using TD ring rolls having a greater pitch between ridges compared to the pitch between ridges of the MD ring rolls.

One will appreciate in view of the disclosure herein that the use of intermeshing rollers with greater or varied ridge pitch can provide the different spacing and thicknesses of the stripes. Thus, a manufacturer can vary the ridge pitch of the intermeshing rollers to vary the pattern of the multi-layer film. The bond density (i.e., the fraction of surface area that is bonded relative to unbonded) and particular pattern provided not only affects the aesthetic appearance of the bag or film, but may also affect the strength characteristics provided. For example, higher bond density may provide increased strength as it provides a greater number of relatively low strength lamination bonds that may be broken so as to absorb forces, preventing such forces from leading to tearing of the bag or film. Film 15c of FIG. 7 has a higher bond density than the film of the bag 100a of FIG. 13.

By way of further example, where the MD tear resistance is lower than TD tear resistance for the particular films employed, it may be advantageous to provide a higher density of bonds in the MD than the TD direction. This may provide greater improvement to MD tear resistance of the multi-layered lightly-laminated film as compared to TD tear resistance improvement. A similar configuration could be provided for films in which the TD tear resistance was lower than MD tear resistance by increasing bond density in the TD direction.

Figure 14:
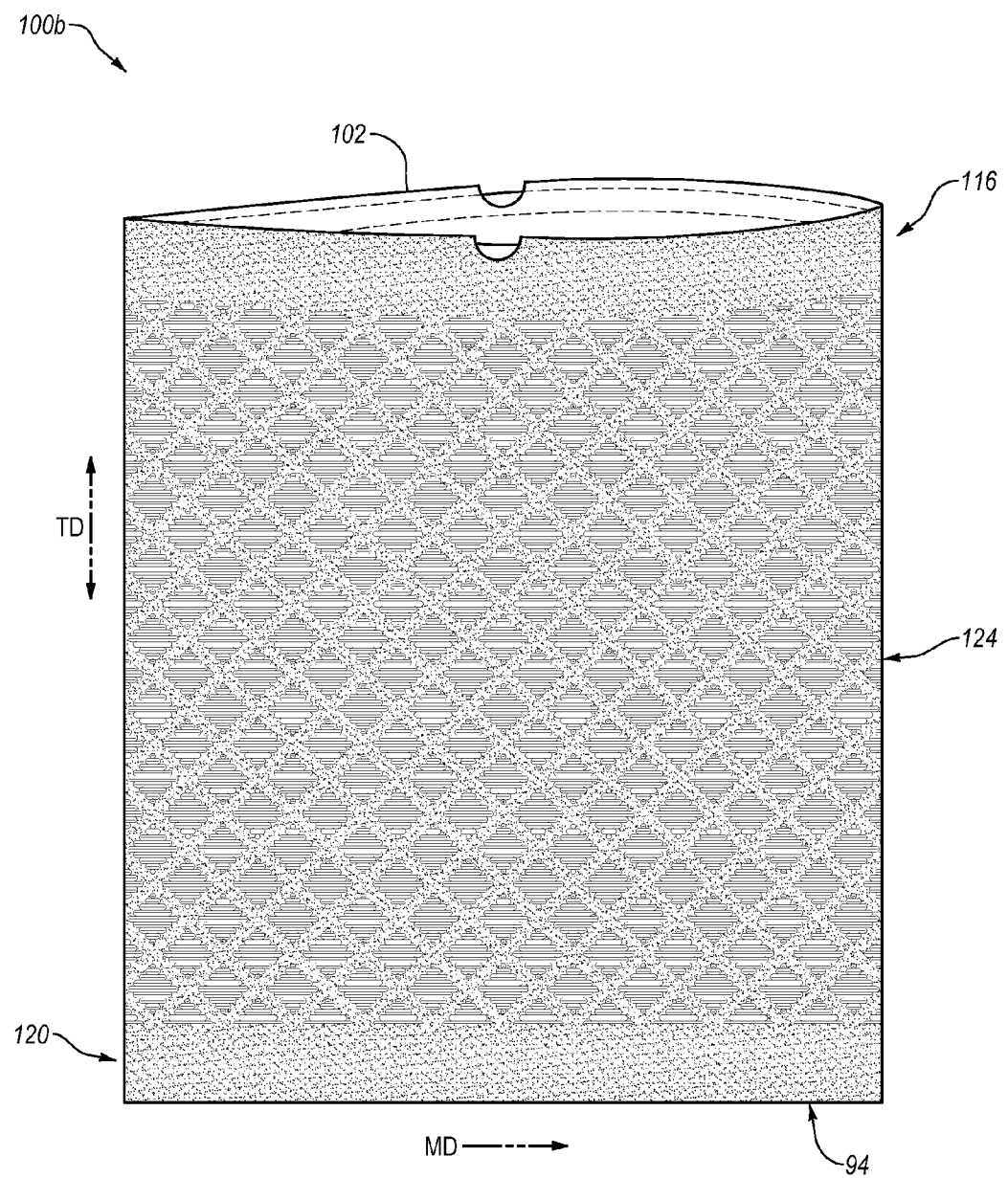
FIG. 14 illustrates a bag incorporating a middle section having lightly bonded regions in accordance with one or more implementations of the present invention.

In addition to varying the pattern of bonded and un-bonded regions in a bag or film, one or more implementations also include providing lightly bonded regions in certain sections of a bag or film, and only un-bonded (or alternatively tightly bonded) regions in other sections of the bag or film. For example, FIG. 14 illustrates a multi-layered bag 100b having an upper section 116 adjacent a top edge 118 that is devoid of bonded regions. Similarly, the multi-layered bag 100b includes a bottom section 120 adjacent a bottom fold or edge 122 devoid of bonded regions. In other words, both the top section 116 and bottom section 120 of the multi-layered bag 100b can each consist only of un-bonded regions. Alternatively, the layers of sections 116 and 120 may be tightly bonded together (e.g., co-extruded). In any case, sections 116 and 120 may be void of bonds.

A middle section 124 of the multi-layered bag 100b between the upper and lower sections 116, 120 on the other hand can include lightly bonded regions interspersed with un-bonded regions. In particular, FIG. 14 illustrates that the middle section can include a strainable network of rib-like elements arranged in diamond patterns similar to the multi-layered lightly-laminated film 15f of FIG. 11. Thus, the middle section 124 of the multi-layered bag 100b can include improved strength created by the weak bonds of the strainable network.

Figure 15:
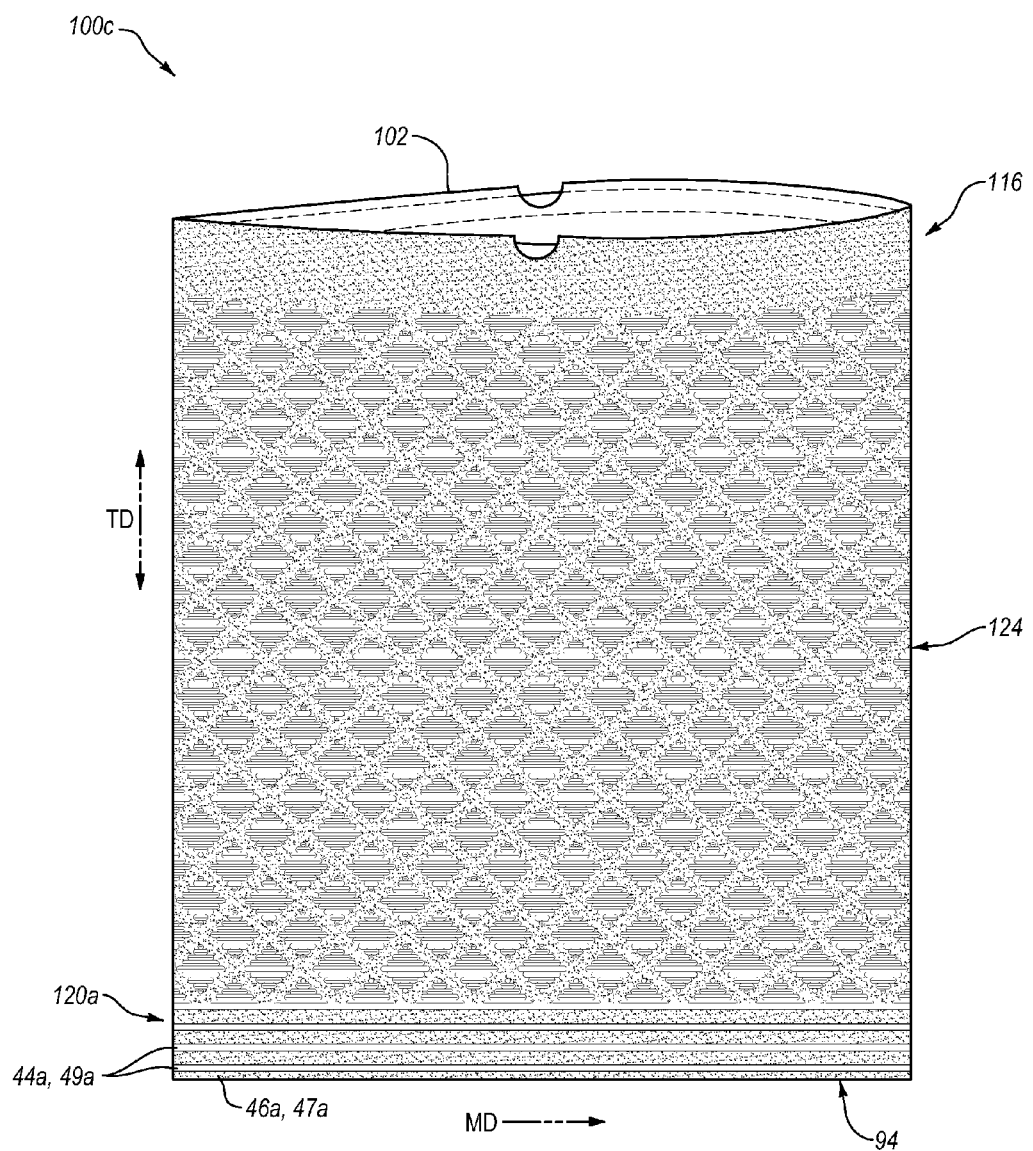
FIG. 15 illustrates a bag incorporating sections of different patterns of lightly bonded regions in accordance with one or more implementations of the present invention.

In one or more additional implementations the present invention includes providing different lightly bonded regions in different sections of a bag or film. For example, FIG. 15 illustrates a multi-layered bag 100c similar to the multi-layered bag 100b of FIG. 14, except that the bottom section 120a includes alternating series of stretched, un-bonded regions 46a, 47a and thicker bonded regions 44a, 49a created by TD ring rolling. Thus, the middle section 124 of the bag 100c can include properties of increased strength as a result of light discontinuous lamination and increased elasticity through geometric deformation, while the bottom section includes increased strength as a result of light partially discontinuous lamination by TD ring rolling.

Thus, one will appreciate in view of the disclosure herein that a manufacturer can tailor specific sections or zones of a bag or film with desirable properties by MD ring rolling, TD ring rolling, DD ring rolling, SELFing, or a combination thereof. One region of the bag may include a first type of incremental stretching to modify the strength parameters and light transmittance, while a second region includes a second type of incremental stretching designed to reduce gauge and maintain or decrease the light transmittance or modify the strength parameters. Thus, a manufacturer can provide any region of a bag with the different incrementally-stretched films and their associated properties described herein above.

Figure 16:
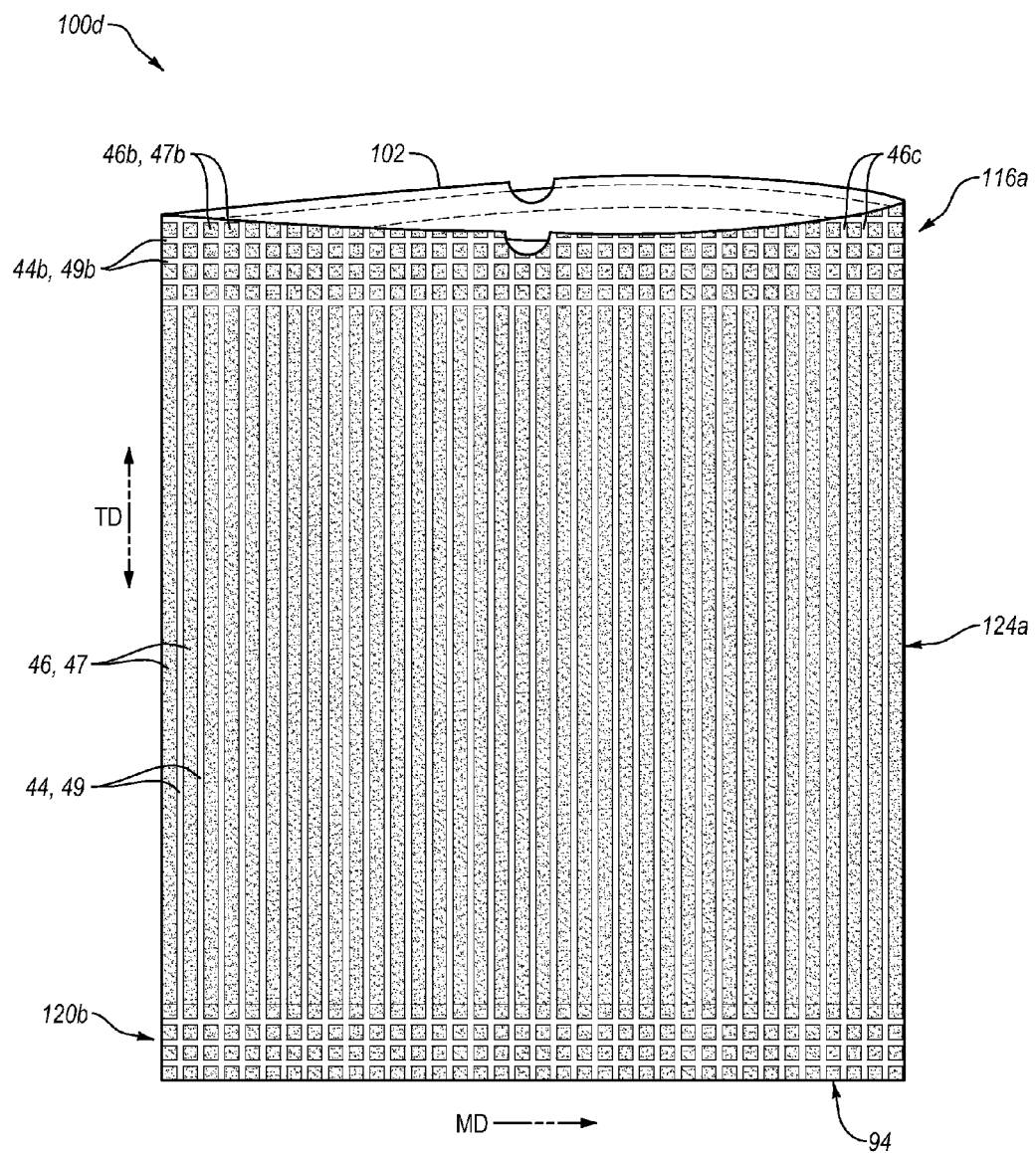
FIG. 16 illustrates another bag incorporating sections of different patterns of lightly bonded regions in accordance with one or more implementations of the present invention.

FIG. 16 illustrates yet another multi-layered bag 100d including an upper section 116a adjacent a top edge 118 that includes alternating series of thicker, bonded regions 44b, 49b and stretched, thinner un-bonded regions 46b, 47b created by MD and TD ring rolling similar to the film 15c of FIG. 7. Furthermore, the middle section 124a of the multi-layered bag 126 can include thicker, bonded regions 44, 49 and stretched, thinner, un-bonded regions 46, 47 in the form of stripes created by MD ring rolling.

Figure 17:
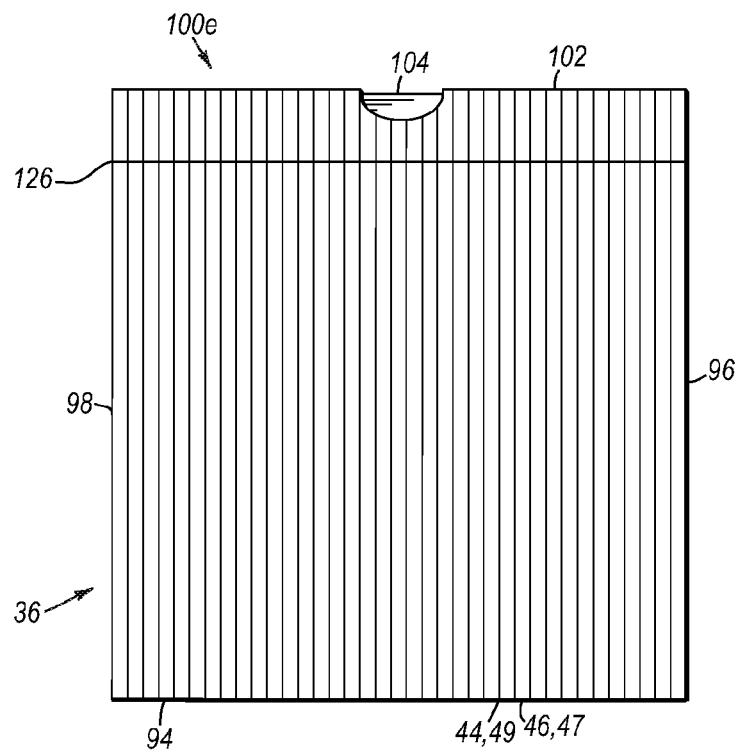
FIG. 17 illustrates another bag incorporating a multi-layered lightly-laminated film formed by passing thermoplastic film through MD ring rolls in accordance with one or more implementations of the present invention.

FIG. 17 illustrate yet another multi-layered bag 100e. The multi-layered bag 100e is formed from a MD incrementally-stretched multi-layered lightly-laminated film 15a, such as that of FIG. 4. The bag 100e can include an inner layer 10c and an outer layer 10c' that are lightly bonded together by bonds 49. Additionally, a hem seal 126 (to hold in the draw string 104) and side seals (i.e., seals at side edges 96 and 98) can additionally secure the inner layer 10c to the outer layer 10c'. A bottom fold 94 can be positioned opposite a top edge 102.

The thicker ribs 44 can include bonded stripes that extend across the bag 100e in a direction transverse (i.e., transverse direction) to a direction in which the film was extruded (i.e., machine direction). In particular, the thicker ribs 44 and the bonds 49 can extend from the bottom 94 of the bag 100e to the top edge 102. As shown by FIG. 17, the bonded stripes or bonded regions 49 can extend across the entire length of the bag 100e. One will appreciate in view of the disclosure herein that the striped pattern 36 may vary depending on the method used to incrementally stretch and partially discontinuously bond adjacent layers of film 10. To the extent that MD or other ring rolling is used to lightly bond the film 10, the striped pattern 36 (e.g., width and spacing of the stripes or stretched regions 44) on the film 10 can depend on the pitch 32 of the ridges 24, 26, the DOE 34, and other factors. As regions 49 represent areas of the multi-layer film in which the adjacent layers are lightly bonded to one another, it will be apparent that altering the spacing and/or width of regions 49 can affect the overall strength of the film. For example, providing more bonded surface area relative to the unbonded surface area can increase the density of such bonds that can absorb forces, increasing the film strength.

Figure 18:
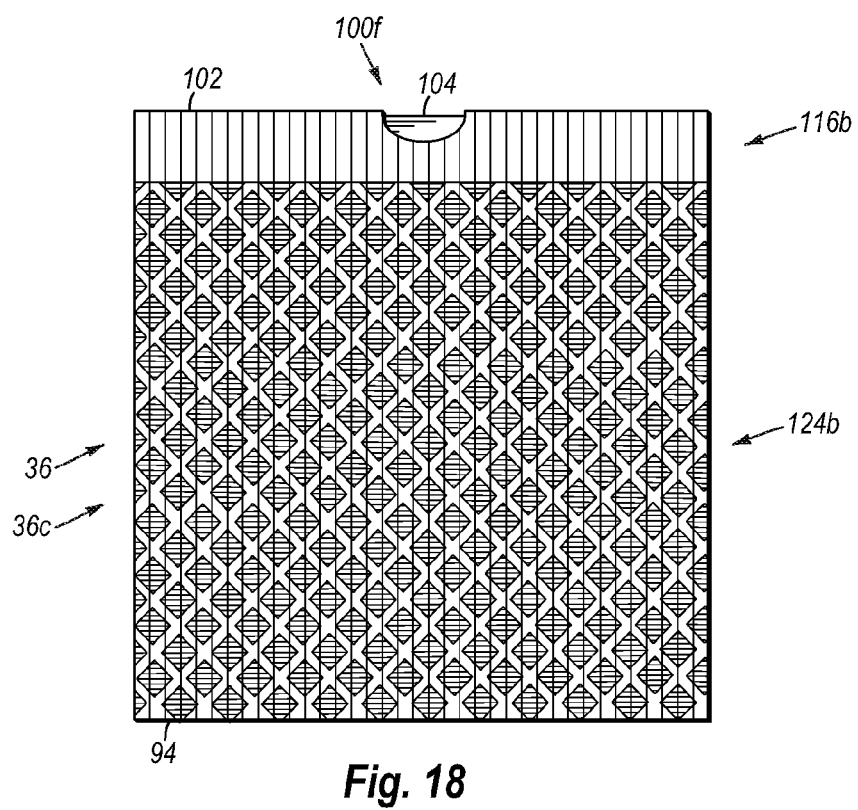
FIG. 18 illustrates a bag incorporating a multi-layered lightly-laminated film formed by passing thermoplastic film through MD ring rollers and SELFing rollers in accordance with one or more implementations of the present invention.

FIG. 18 illustrates a multi-layered bag 100f similar to the multi-layered bag 100e of FIG. 17, albeit that a lower section 124b of the bag 100f includes a strainable network in a pattern 36c of diamond shaped ribs similar to that described herein in above in reference to FIGS. 9-11. Thus, the density of bonds in the middle section 124b of the bag 100f can be greater than the density of bonds in an upper section 116b of the multi-layer bag 100f. Along related lines the lower section 124b of the multi-layer bag 100f can have a lower gauge-by-weight (i.e., be thinner on average) than the upper section 116b.

FIG. 18 further illustrates that the upper section 116b can begin at the hem seal and extend to the top edge 102 of the multi-layer bag 100f. Additionally, the lower section 124b of the multi-layer bag 100f can extend from the hem seal to the bottom fold 64 of the multi-layer bag 100f.

Figure 19:
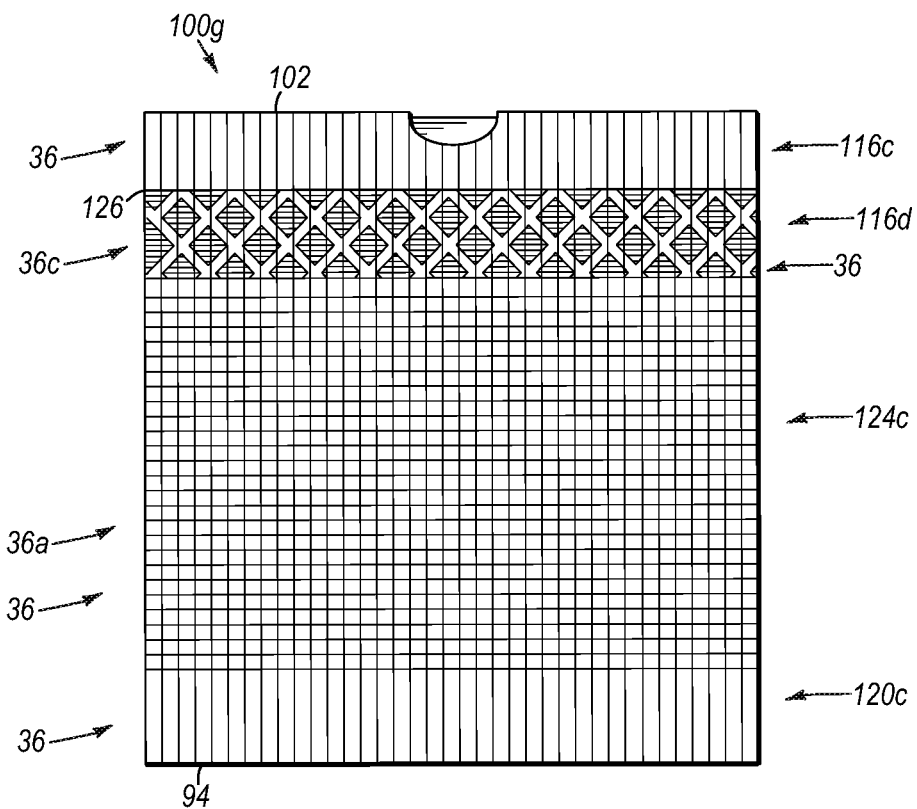
FIG. 19 illustrates another bag incorporating a multi-layered lightly-laminated film formed by passing thermoplastic film through MD ring rollers, TD ring rollers, and SELFing rollers in accordance with one or more implementations of the present invention.

FIG. 19 illustrates yet another multi-layer bag 100g similar to the multi-layer bag 100e of FIG. 17. The multi-layer bag 100g includes a top section 116c that extends from the top edge 102 of the multi-layer bag 100g to the hem seal 126. The multi-layer bag 100g also includes a bottom section 120c that extends from the bottom 94 of the multi-layer bag 100g toward the top edge 102. In one or more embodiments, the top section 116c and the bottom section 120c can have approximately the same width as shown in FIG. 19. The multi-layer bag 100g can further include an upper section 116d that extends from the top section 116c and the hem seal 126 toward the bottom 94 of the multi-layer bag 100g. In one or more embodiments, the upper section 116d has a width approximately the same as or the same as the top and bottom sections 116c, 120c. Finally, the multi-layer bag 100g can include a middle section 124c located between the upper section 116d and the bottom section 120c. The middle section 124c can comprise the majority of the multi-layer bag 100g as shown in FIG. 19.

As with the other multi-layer bags described herein, the multi-layer bag 100g can comprise an inner layer or film of material bonded to an outer layer or film of material. FIG. 19 illustrates that the different sections of the multi-layer bag 100g can include different bond patterns to provide the different areas of the multi-layer bag 100g with different properties. FIG. 19 illustrates that the entire multi-layer bag 100g can include a pattern 36 of thicker, bonded regions and stretched, unbounded regions as described above in relation to FIGS. 3A-4.

Furthermore, FIG. 19 illustrates that the bottom and top sections 120c, 116c can consistent of the pattern 36 of thicker, bonded regions and stretched, unbounded regions (i.e., the only bonds in the bottom and top sections 120c, 116 besides the side seals and hem seal(s) can be bonds formed by MD ring rolling). The upper section 116c can further include a strainable network in a pattern 36c of diamonds or anther shape as described above in relation to FIGS. 9-11 in addition to the pattern 36 of bonds. Finally, the middle section 124c can include a pattern 36a of MD extending thicker, bonded regions and stretched, unbounded regions as described above in relation to FIGS. 5A-6.

Figure 20:
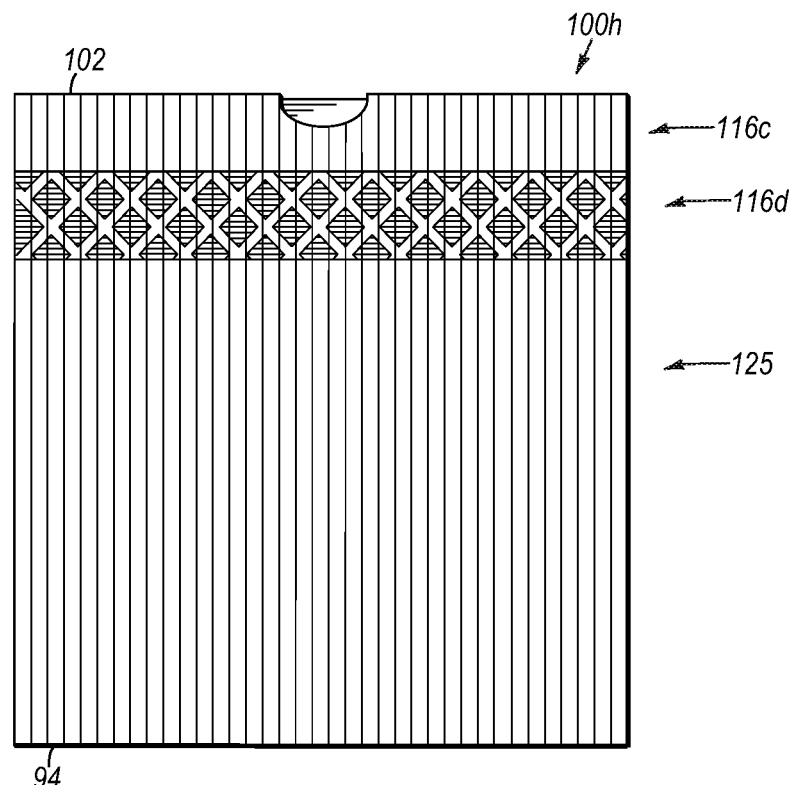
FIG. 20 illustrates another bag incorporating a multi-layered lightly-laminated film formed by passing thermoplastic film through MD ring rolls and SELFing rollers in accordance with one or more implementations of the present invention.

FIG. 20 illustrates still another the multi-layer bag 100h. The multi-layer bag 100h includes a top section 116c that extends from the top edge 102 of the multi-layer bag 100g to the hem seal 126. The multi-layer bag 100h includes an upper section 116d that extends from the top section 116c and the hem seal 126 toward the bottom 94 of the multi-layer bag 100g. In one or more embodiments, the top section 116c and the upper section 116d can have approximately or exactly the same width as shown in FIG. 20. Finally, the multi-layer bag 100h can include a bottom section 125 that extends from the bottom 94 of the multi-layer bag 100h toward to the upper section 116d.

FIG. 20 illustrates that the multi-layered bag 100h is similar to the multi-layered bag 100e of FIG. 17, albeit that the upper section 116d of the bag 100f includes a strainable network in a pattern 36c of diamond shaped ribs similar to that described herein in above in reference to FIGS. 9-11. Thus, the density of bonds in the upper section 124b of the bag 100h can be greater than the density of bonds elsewhere in the bag 115c.

Thus, one will appreciate in view of the disclosure herein that a manufacturer can tailor specific sections or zones of a bag or film with desirable properties by MD, TD, DD ring rolling, SELF'ing, or combinations thereof. One will appreciate in view of the disclosure herein that one or more implementations can include bonded regions arranged in other patterns/shapes. Such additional patterns include, but are not limited to, intermeshing circles, squares, diamonds, hexagons, or other polygons and shapes. Additionally, one or more implementations can include bonded regions arranged in patterns that are combinations of the illustrated and described patterns/shapes.

In one or more implementations, each bonded pattern may have a largest TD patterned width in the transverse direction (TD) of less than about 25% of the transverse width of the patterned film, or less than about 20% of the transverse width of the film, or less than about 10% of the transverse width of the patterned film, or less than about 5% of the transverse width of the film. In one or more implementations, the bonded patterns should have a largest MD patterned width in the machine direction of less than about 25% of the machine width 140 of the patterned film, or less than about 20% of the machine width of the film, or less than about 10% of the machine width of the film, or less than about 5% of the transverse width of the film.

In one or more implementations, the width of the bonded patterns in the transverse direction may be greater than the width of the un-bonded areas in the transverse direction. The width of the bonded patterns in the machine direction or direction perpendicular to the transverse direction may be greater than the width of the un-bonded areas in the machine direction.

The bond density of the multi-layered lightly-laminated films and bags incorporating the same can be varied to control the bond strength between the layers. For example, bonded areas of multi-layered lightly-laminated films and bags incorporating the same can be large in comparison to un-bonded areas. For example, bonded areas of multi-layered lightly-laminated films and bags incorporating the same can represent at least about 50% of the total area of the entire film, the entire bag, or the section where the lamination occurs, or at least about 60% of the entire film, the entire bag, or total area of the section where the lamination occurs, at least about 70% of the entire film, the entire bag, or total area of the section where the lamination occurs, at least about 80% of the total area of the entire film, the entire bag, or section where the lamination occurs. In other embodiments, the bonded areas of multi-layered lightly-laminated films and bags incorporating the same can represent substantially less than about 50% of the total area of the entire film, the entire bag, or section where the lamination occurs, or less than about 40% of the total area of the entire film, the entire bag, or section where the lamination occurs, or less than about 30% of the total area of the entire film, the entire bag, or section where the lamination occurs, or less than about 10% of the total area of the entire film, the entire bag, or section where the lamination occurs.

As mentioned previously, numerous methods can be used to provide the desired degree of lamination in the bonded areas. Any of the described ring rolling techniques may be combined with other techniques in order to further increase the strength of the lamination bond while maintaining bond strength below the strength of the weakest layer of the multi-layer film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Adjusting (e.g., increasing) the strength of the relatively light lamination bonding could be achieved by addition of a tackifier or adhesive to one or more of the skin plies of a multi-layer film, or by incorporating such a component into the material from which the film layer is formed. For example, the outer skin sublayers of a given layer could contain from about 0 to about 50% of a polyolefin plastomer tackifier such as a $C_4$-$C_{10}$ olefin to adjust bonding strength by increasing the tackiness of the surfaces of adjacent layers to be lightly laminated.

In one or more implementations, a component may be included to decrease tackiness. For example, the outer skin sublayers could contain higher levels of slip or anti-block agents, such as talc or oleamide (amide of oleic acid), to decrease tack. Similarly, these surfaces may include very low levels of or be substantially void of slip or anti-block agents to provide a relative increase in tackiness. In still further embodiments the films 10c, 10c can be co-extruded together with a weak bond. Ring rolling or SELFing can then cause portions of the weak bonds to break thereby forming bonded and un-bonded regions such as those described hereinabove.

In another implementation, a pattern may be formed by embossing, in a process similar to ring rolling. Embossed patterns such as squares, diamonds, circles or other shapes may be embossed into a multi-layer film. The embossed, laminated film layers may be prepared by any suitable means by utilizing two or more layers of preformed web of film and passing them between embossing rollers. The method of embossing multiple layers of film can involve calendar embossing two or more separate, non-laminated layers with discrete "icons" to form bonded areas or icons, each icon having a bonded length and separated from adjacent icons by an equivalent un-bonded length. Such icons may be any desired design or shape, such as a heart, square, triangle, diamond, trapezoid, or circle.

One or more implementations of the present invention can also include methods of forming multi-layered lightly-laminated film with maintained or decreased light transmittance and bags including the same. FIGS. 21-24 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

Figure 21:
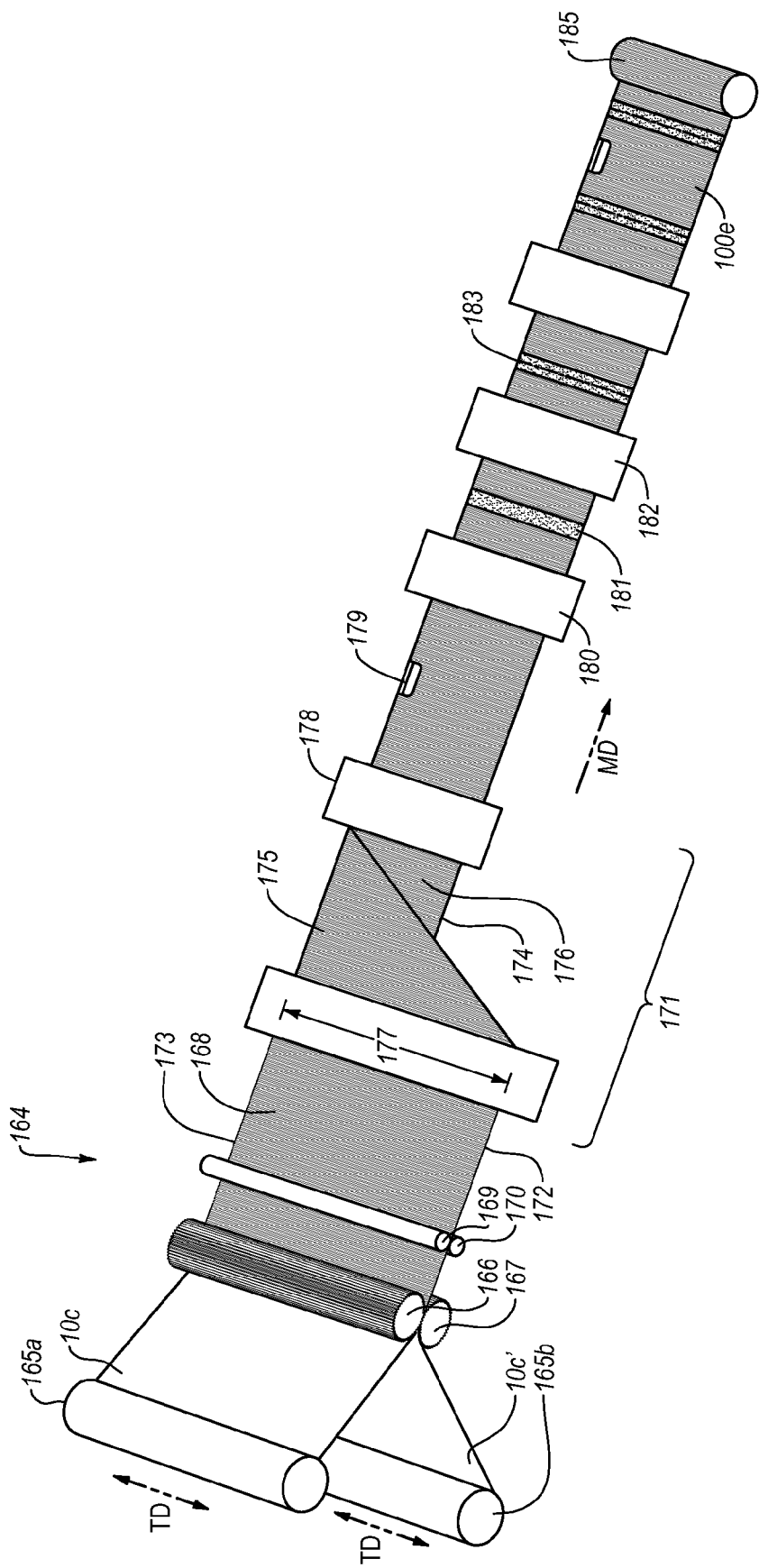
FIG. 21 illustrates a schematic diagram of a bag manufacturing process in accordance with one or more implementations of the present invention.

FIG. 21 illustrates an exemplary embodiment of a high-speed manufacturing process 164 for creating multi-layered lightly-laminated thermoplastic film(s) with maintained or decreased light transmittance and then producing multi-layered plastic bags therefrom. According to the process 164, a first thermoplastic film layer 10c and a second thermoplastic film layer 10c' are unwound from roll 165a and 165b, respectively, and directed along a machine direction. Alternatively, the film layers 10c, 10c' can be directly from one or more extrusion towers rather than stock rolls 165a, 165b. The first layer 10c can include a first opacity agent and the second layer 10c' can include a second opacity agent as described above.

The film layers 10c, 10c' may pass between first and second cylindrical intermeshing rollers 166, 167 to incrementally stretch and lightly laminate the initially separate film layers 10c, 10c' to create un-bonded regions and bonded regions in at least one section of a multi-layered lightly-laminated film 15a. The intermeshing rollers 166, 167 shown in FIG. 21 have a construction similar to that of intermeshing rollers 12, 14 of FIGS. 3A-3B. In other embodiments, the intermeshing rollers 166, 167 can have the configuration of any of the other intermeshing rollers shown or described herein. The rollers 166, 167 may be arranged so that their longitudinal axes are perpendicular to the machine direction. Additionally, the rollers 166, 167 may rotate about their longitudinal axes in opposite rotational directions as described in conjunction with FIG. 3A. In various embodiments, motors may be provided that power rotation of the rollers 166, 167 in a controlled manner. As the film layers 10c, 10c' pass between the first and second rollers 166, 167 the ridges and/or teeth of the intermeshing rollers 166, 167 can form a multi-layered lightly-laminated film 13.

During the manufacturing process 164, the multi-layered lightly-laminated film 15a can also pass through a pair of pinch rollers 169, 170. The pinch rollers 169, 170 can be appropriately arranged to grasp the multi-layered lightly-laminated film 15a.

A folding operation 171 can fold the multi-layered lightly-laminated film 15a to produce the sidewalls of the finished bag. The folding operation 171 can fold the multi-layered lightly-laminated film 15a in half along the transverse direction. In particular, the folding operation 171 can move a first edge 172 adjacent to the second edge 173, thereby creating a folded edge 174. The folding operation 171 thereby provides a first film half 175 and an adjacent second web half 176. The overall width 177 of the second film half 176 can be half the width 177 of the pre-folded multi-layered lightly-laminated film 15*a*.

To produce the finished bag, the processing equipment may further process the folded multi-layered lightly-laminated film 15*a*. In particular, a draw tape operation 178 can insert a draw tape 179 into ends 172, 173 of the multi-layered lightly-laminated film 15*a*. Furthermore, a sealing operation 180 can form the parallel side edges of the finished bag by forming heat seals 181 between adjacent portions of the folded multi-layered lightly-laminated film 15*a*. The heat seal 181 may strongly bond adjacent layers together in the location of the heat seal 181 so as to tightly seal the edges of the finished bag. The heat seals 181 may be spaced apart along the folded multi-layered lightly-laminated film 15*a* to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 100*e* that may be separated from the multi-layered lightly-laminated film 15*a*. A roll 185 can wind the multi-layered lightly-laminated film 15*a* embodying the finished bags 184 for packaging and distribution. For example, the roll 185 may be placed into a box or bag for sale to a customer.

In still further implementations, the folded multi-layered lightly-laminated film 15*a* may be cut into individual bags along the heat seals 181 by a cutting operation. In another implementation, the folded multi-layered lightly-laminated film 15*a* may be folded one or more times prior to the cutting operation. In yet another implementation, the side sealing operation 180 may be combined with the cutting and/or perforation operations 182.

Figure 22:
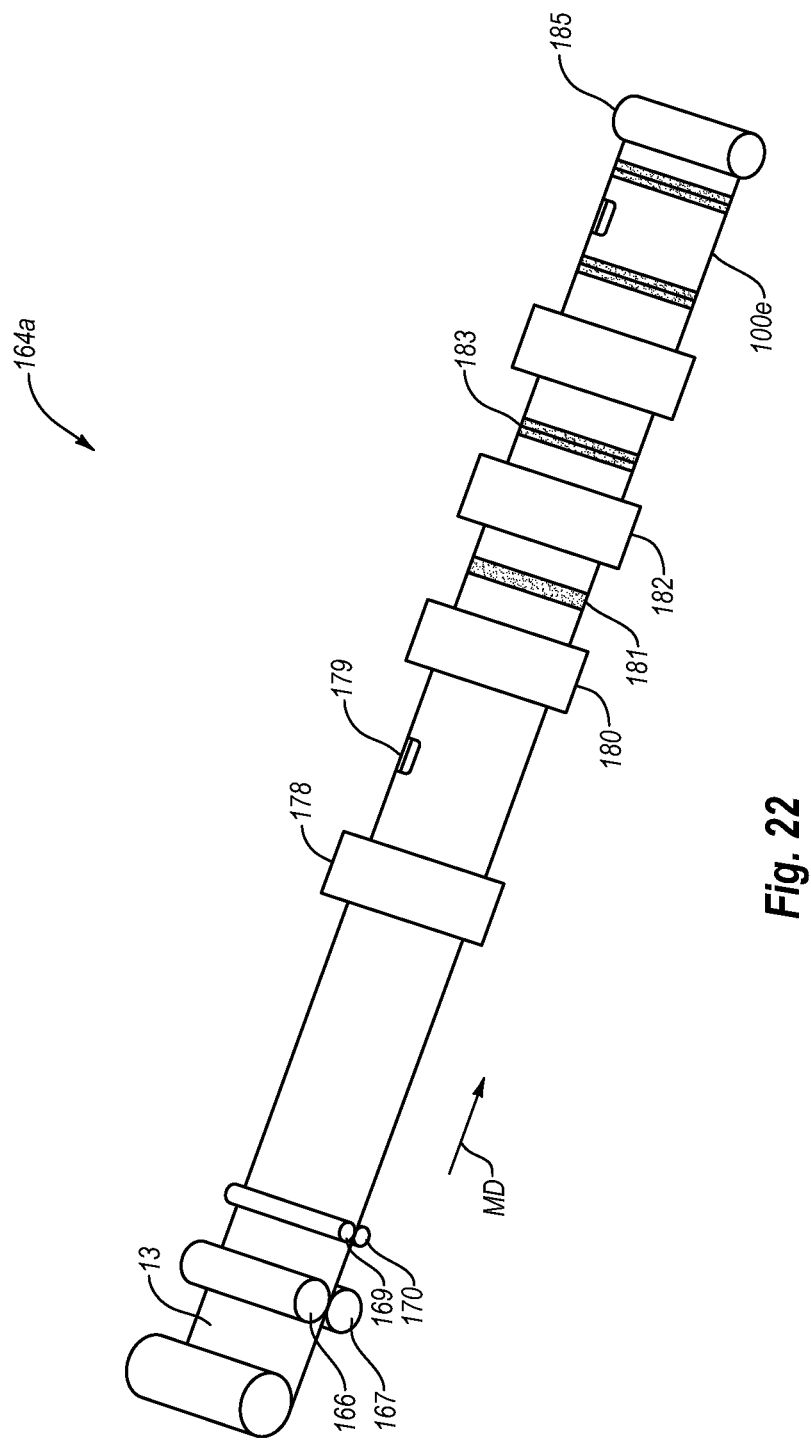
FIG. 22 illustrates a schematic diagram of another bag manufacturing process in accordance with one or more implementations of the present invention.

One will appreciate in view of the disclosure herein that the process 164 described in relation to FIG. 21 can be modified to omit or expanded acts, or vary the order of the various acts as desired. For example, FIG. 22 illustrates another manufacturing process 164*a* for producing a plastic bag from an intermittently bonded and stretched multi-layer film with maintained or decreased light transmittance. FIG. 22 illustrates another manufacturing process 164*a* for producing a plastic bag from a multi-layered lightly-laminated film. The process 164*a* is similar to process 164 of FIG. 19, except that the film layers 10*c*, 10*c'* are folded in half to form c-, u-, or j-folded films prior to beginning the process. Methods of forming c-, u-, or j-folded films are described in International Patent Application No. PCT/US14/24431 filed Mar. 12, 2014 and entitled STOCK ROLLS CONTAINING A FIRST FOLDED FILM WITHIN A SECOND FOLDED FILM AND METHODS OF MAKING THE SAME and U.S. Patent Application Publication No. 2013/0115396. Each of the above-referenced patents and applications is hereby incorporated by reference in its entirety.

As shown, according to the process 164*a* the fold films 13 directed along a machine direction (i.e., the direction in which both films forming the fold films 13 were extruded). The fold films 13 pass between first and second cylindrical intermeshing rollers 166, 167 to incrementally stretch and lightly laminate the initially separate film layers 10*c*, 10*c'* to create un-bonded regions and bonded regions. The intermeshing rollers 166, 167 have a construction similar to that of intermeshing rollers 12, 14 of FIGS. 1A-1B. In other embodiments, the intermeshing rollers 166, 167 can have the configuration of any of the other intermeshing rollers shown or described herein. As the fold films 13 pass between the first and second rollers 166, 167 the ridges and/or teeth of the intermeshing rollers 166, 167 can form a multi-layered lightly-laminated film. In other words, four layers of film (i.e., two halves of each film folded over) can pass through the intermeshing rollers 166, 167 at the same time. One will appreciate in view of the disclosure herein that the fold of the folded films 13 can be positioned opposite the side in which the draw tape 179 is inserted.

In particular, the intermeshing rollers 166, 167 can incrementally stretch the fold films 13 in the machine direction to form stretched, thinner regions 46. In one or more embodiments both of the films 10*c*, 10*c'* forming the fold films 13 are predominately oriented in the machine direction. In such embodiments, the intermeshing rollers 167, 168 can further orient the stretched, thinner regions 46 in the machine direction such that the stretched, thinner regions 46 are more oriented in the machine direction that the thicker regions 44 that are un-stretched or less stretched compared to the stretched, thinner regions 46.

As the fold films 13 comprise two layers of film folded in a c, j, or u, the intermeshing rollers 166, 167 can lightly laminated not only the outer film layer to the inner film layer, but can also lightly laminate the two halves of the inner layer together as they are proximate each other. In such embodiments, after passing through the intermeshing rollers 166, 167, either before or after passing through the nip rollers 169, 170, the fold films 13 can pass over a spreader bar. Passing over the spreader bar can separate the two halves of the fold films 13 and break any bonds between the two halves of the inner layer formed when passing through the intermeshing rollers 166, 167.

As described above in relation to FIG. 21, the process can further involve inserting a draw tape 179 into ends of now incrementally-stretched and lightly laminated films 13. Furthermore, a sealing operation 180 can form the parallel side edges of the finished bag by forming heat seals 181 between adjacent portions of the folded multi-layered lightly-laminated film 10*b*. The heat seal 181 may strongly bond adjacent layers together in the location of the heat seal 181 so as to tightly seal the edges of the finished bag. The heat seals 181 may be spaced apart along the folded multi-layered lightly-laminated film 10*b* to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 100*e* (see e.g., FIG. 17) that may be separated from the multi-layered lightly-laminated film assembly 13. A roll 185 can wind the multi-layered lightly-laminated film 10*b* embodying the finished bags 184 for packaging and distribution. For example, the roll 185 may be placed into a box or bag for sale to a customer.

In still further implementations, the folded multi-layered lightly-laminated film 10*b* may be cut into individual bags along the heat seals 181 by a cutting operation. In another implementation, the folded multi-layered lightly-laminated film assembly 13 may be folded one or more times prior to the cutting operation. In yet another implementation, the side sealing operation 180 may be combined with the cutting and/or perforation operations 182.

Figure 23:
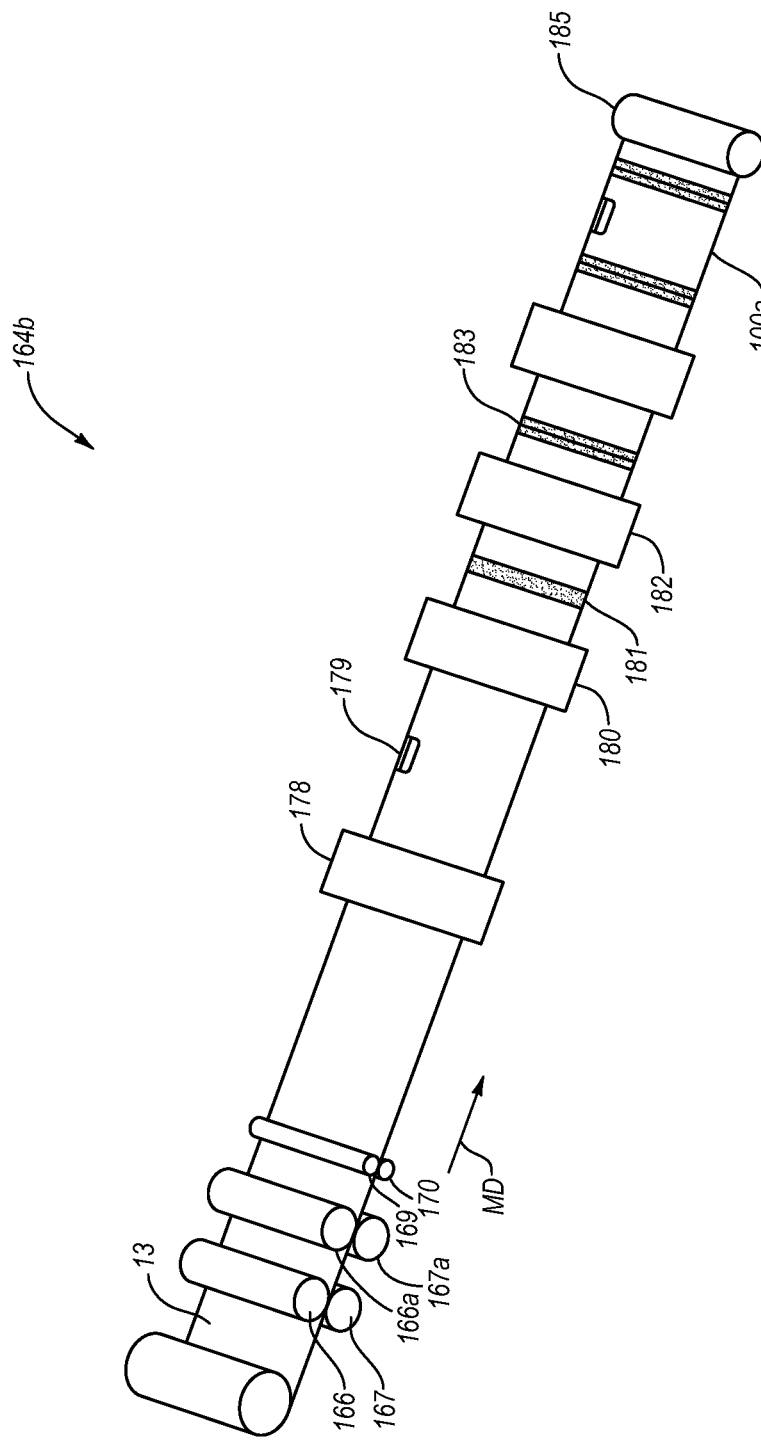
FIG. 23 illustrates a schematic diagram of yet another bag manufacturing process in accordance with one or more implementations of the present invention.

FIG. 23 illustrates another manufacturing process 164*b* for producing a multi-layered lightly-laminated film and a multi-layered bag (e.g., bag 100*a* of FIG. 17 or 100*h* of FIG. 20) therefrom. The process 164*b* can be similar to process 164a of FIG. 22, except that the fold film assembly 13 can pass through a second set of intermeshing rollers 166a, 167a, respectively, after passing through intermeshing rollers 166, 167. In one or more embodiments, the intermeshing rollers 166a, 167a can comprise SELFing rollers (similar to those described above in relation to FIG. 9). The intermeshing rollers 166a, 167a can further stretch and lightly bond at least a portion of the layers of the folded film assembly 13 together. For example, as described above, the intermeshing rollers 166a, 167a can further stretch the film assembly and form a strainable network in the film assembly. Passing the layers of the film assembly 13 simultaneously together through the pair of SELFing rollers can comprises passing the layers of the film assembly simultaneously together through a pair of SELFing rollers having intermeshing teeth extending along only a portion of a length of each roller so as to only create strainable networks in a portion (e.g., portion 124b of FIG. 16 or portion 116d of FIGS. 19 and 20) of the film assembly 13.

Figure 24:
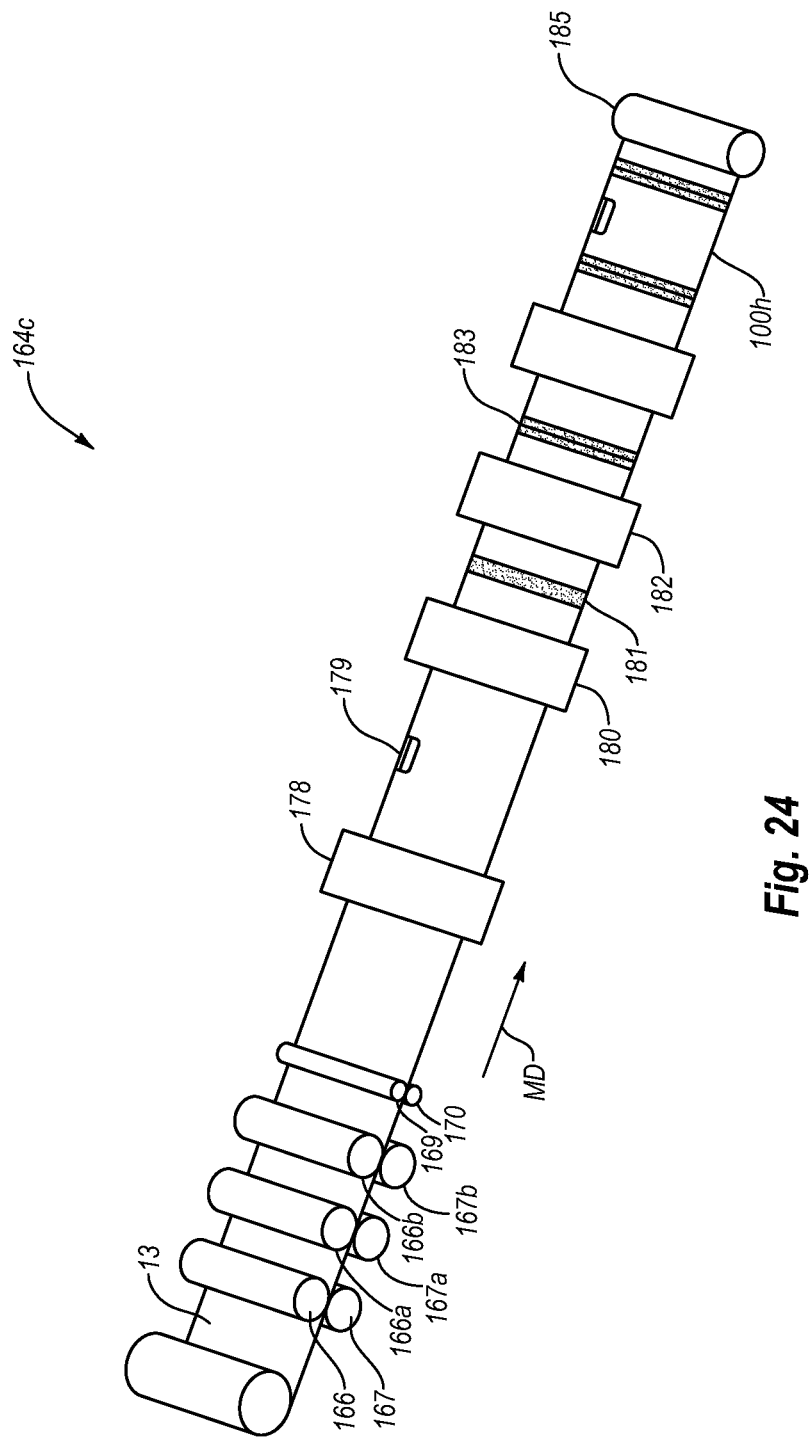
FIG. 24 illustrates a schematic diagram of still another bag manufacturing process in accordance with one or more implementations of the present invention.

FIG. 24 illustrates yet another manufacturing process 164c for producing a multi-layered lightly-laminated film and a multi-layered bag 100h therefrom. The process 164c can be similar to process 164b of FIG. 23, except that the fold film assembly 13 can pass through a third set of intermeshing rollers 166b, 167b, respectively, after passing through intermeshing rollers 166, 167, 166a, 167a. In one or more embodiments, the intermeshing rollers 166b, 167b can comprise TD rollers (similar to those described above in relation to FIGS. 5A-5B). The intermeshing rollers 166b, 167b can further stretch and lightly bond at least a portion of the layers of the folded film assembly 13 together. For example, as described above, the intermeshing rollers 166b, 167b can further stretch the film assembly and form a strainable network in the film assembly. Passing the layers of the film assembly 13 simultaneously together through the pair of SELFing rollers can form machine-direction extending stretched regions, machine-direction extending thicker ribs, and machine-direction extending bonds that secure machine-direction thicker ribs in outer film-layer to machine-direction thicker ribs in the inner film-layer.

Accordingly, FIGS. 1A-24 and the corresponding text, therefore, specifically show, describe, or otherwise provide a number of systems, components, apparatus, and methods for forming an intermittingly bonded and stretched multi-layer film with maintained or decreased light transmittance. These apparatus and methods can stretch films as discussed that, at the very least, avoid, increasing the film's light transmittance despite a reduction in gauge. There are several advantages associated with incrementally stretching and lightly bonding two thermoplastic films in accordance with one or more implementations of the present invention. First, incrementally stretching and lightly bonding two thermoplastic films can reduce the amount of thermoplastic material needed to produce a film of certain dimensions. Manufacturers can decrease the cost of their products if they use less thermoplastic material in their products. Depending on the amount that a film is stretched, this cost savings can be significant.

Second, the ribbed pattern that is imparted onto an incrementally-stretched film can make the film feel more durable to consumers. This can be important because consumers of products made in whole or in part from a thermoplastic film often associate the strength of a film with its feel. If a film feels thin or insubstantial, consumers may believe that the film is weak and fragile.

Third, incrementally stretching and lightly bonding two thermoplastic films in accordance with one or more implementations of the present invention, the films' light transmittance can be maintained or even decreased. This finding is unexpected, as it is generally understood that stretching a thermoplastic film will increase the film's light transmittance. Indeed, in one or more implementations the light transmittance of a thermoplastic film can be maintained or decreased despite the reduction in gauge.

The present invention may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A multi-layer thermoplastic film comprising:
   a first layer of thermoplastic material, the first layer of thermoplastic material comprising a first opacity agent and a first plurality of alternating thicker ribs and thinner stretched webs, wherein a total weight concentration of the first opacity agent in the first layer of thermoplastic material is between 0.25% and 1.0%, wherein the first plurality of alternating thicker ribs and thinner stretched webs are either parallel or perpendicular to a predominate direction of orientation of the first layer of thermoplastic material;
   a second layer of thermoplastic material intermittently secured directly to the first layer of thermoplastic material, the second layer of thermoplastic material comprising a second opacity agent and a second plurality of alternating thicker ribs and thinner stretched webs, wherein the second plurality of alternating thicker ribs and thinner stretched webs are either parallel or perpendicular to a predominate direction of orientation of the second layer of thermoplastic material;
   a first light transmittance in a direction through the first layer and then the second layer at a first location of the multi-layer thermoplastic film; and
   a second light transmittance in a direction through the second layer and then the first layer at the first location of the multi-layer thermoplastic film, wherein the first light transmittance is lesser than the second light transmittance.

2. The multi-layer thermoplastic film as recited in claim 1, wherein:
   the first layer comprises a third light transmittance;
   the second layer comprises a fourth light transmittance; and
   the third light transmittance is less than the fourth light transmittance.

3. The multi-layer thermoplastic film as recited in claim 1, wherein the first light transmittance is between 3% and 6% smaller than the second light transmittance.

4. The multi-layer thermoplastic film as recited in claim 1, wherein the first opacity agent comprises a light-reflecting opacity agent and the second opacity agent comprises a light-absorbing opacity agent.

5. The multi-layer thermoplastic film as recited in claim 4, wherein the second layer of thermoplastic material appears cloudy gray or transparent.

6. The multi-layer thermoplastic film as recited in claim 4, wherein the first opacity agent comprises a white pigment and the second opacity agent comprises a black pigment.

7. The multi-layer thermoplastic film as recited in claim 1, wherein:
the first plurality of alternating thicker ribs and thinner webs comprises a first set of thicker ribs and thinner webs extending in a first direction across the first layer and a second set of thicker ribs and thinner webs extending in a second direction across the first layer; and
the second plurality of alternating thicker ribs and thinner webs comprises a third set of thicker ribs and thinner webs extending in the first direction across the second layer and a fourth set of thicker ribs and thinner webs extending in the second direction across the second layer.

8. The multi-layer thermoplastic film as recited in claim 7, wherein the first direction comprises a machine direction and the second direction comprises a transverse direction.

9. The multi-layer thermoplastic film as recited in claim 1, further comprising a plurality of bonds securing the first layer to the second layer.

10. The multi-layer thermoplastic film as recited in claim 9, wherein the plurality of bonds are aligned with and secure thicker ribs of the first layer to thicker ribs of the second layer.

11. The multi-layer thermoplastic film as recited in claim 1, wherein the multi-layer thermoplastic film is devoid of voiding agents.

12. A multi-layer thermoplastic film comprising:
a first layer of thermoplastic material, the first layer of thermoplastic material comprising a first opacity agent and a first plurality of alternating thicker ribs and thinner stretched webs, wherein the first plurality of alternating thicker ribs and thinner stretched webs are either parallel or perpendicular to a predominate direction of orientation of the first layer of thermoplastic material;
a second layer of thermoplastic material intermittently secured directly to the first layer of thermoplastic material, the second layer of thermoplastic material comprising:
a second opacity agent; and
a second plurality of alternating thicker ribs and thinner stretched webs, wherein the second plurality of alternating thicker ribs and thinner stretched webs are either parallel or perpendicular to a predominate direction of orientation of the second layer of thermoplastic material;
a first average light transmittance across the multi-layer thermoplastic film in a direction through the first layer and then the second layer; and
a second average light transmittance across the multi-layer thermoplastic film in a direction through the second layer and then the first layer, wherein the first average light transmittance is lesser than the second average light transmittance.

13. The multi-layer thermoplastic film as recited in claim 12, wherein the first light transmittance is between 3% and 6% smaller than the second light transmittance.

14. The multi-layer thermoplastic film as recited in claim 12, wherein the first opacity agent comprises a light-reflecting opacity agent and the second opacity agent comprises a light-absorbing opacity agent.

15. The multi-layer thermoplastic film as recited in claim 14, wherein a total weight concentration of the light-absorbing opacity agent in the second layer of thermoplastic material is between 0.25% and 1.0% such that the second layer of thermoplastic material appears cloudy gray or transparent.

16. The multi-layer thermoplastic film as recited in claim 14, wherein the first opacity agent comprises a white pigment and the second opacity agent comprises a black pigment.

17. The multi-layer thermoplastic film as recited in claim 12, wherein:
the first plurality of alternating thicker ribs and thinner webs comprises a first set of thicker ribs and thinner webs extending in a first direction across the first layer and a second set of thicker ribs and thinner webs extending in a second direction across the first layer; and
the second plurality of alternating thicker ribs and thinner webs comprises a third set of thicker ribs and thinner webs extending in the first direction across the second layer and a fourth set of thicker ribs and thinner webs extending in the second direction across the second layer.

18. The multi-layer thermoplastic film as recited in claim 17, wherein the first direction comprises a machine direction and the second direction comprises a transverse direction.

19. The multi-layer thermoplastic film as recited in claim 12, further comprising a plurality of bonds securing the first layer to the second layer.

20. The multi-layer thermoplastic film as recited in claim 19, wherein the bonds of the plurality of bonds are aligned with and secure thicker ribs of the first layer to thicker ribs of the second layer.

* * * * *